(12) United States Patent  (10) Patent No.: US 7,426,077 B2
Miyagawa et al.  (45) Date of Patent: Sep. 16, 2008

(54) PORTABLE SCREEN DEVICE

(75) Inventors: Yukio Miyagawa, Tokyo (JP); Teruyuki Abe, Tokyo (JP); Kazuharu Seki, Tokyo (JP)

(73) Assignee: Izumi-Cosmo Company, Limited, Osaka (JP)

( * ) Notice: Subject to any disclaimer, the term of this patent is extended or adjusted under 35 U.S.C. 154(b) by 17 days.

(21) Appl. No.: 11/585,191

(22) Filed: Oct. 24, 2006

(65) Prior Publication Data

US 2008/0094699 A1   Apr. 24, 2008

(51) Int. Cl.
   *G03B 21/56* (2006.01)
(52) U.S. Cl. ...................................... 359/461
(58) Field of Classification Search ................. 359/461; 396/3

See application file for complete search history.

(56) References Cited

U.S. PATENT DOCUMENTS 5,581,401 A * 12/1996 Takamoto et al. ........... 359/443
5,706,130 A * 1/1998 Rosen ....................... 359/443
5,798,861 A * 8/1998 Doat ......................... 359/461
6,046,845 A * 4/2000 Niwa et al. ................. 359/443
2007/0002440 A1 * 1/2007 Miyagawa et al. .......... 359/461

FOREIGN PATENT DOCUMENTS

JP   05-94837   * 12/1993
JP   6-36048      5/1994

* cited by examiner

*Primary Examiner*—Christopher Mahoney
(74) *Attorney, Agent, or Firm*—Wenderoth, Lind & Ponack, L.L.P.

(57) ABSTRACT

A portable screen device including a casing, an extendable screen, and an extendable screen supporting column which has one end pivotally supported at a center portion of a back surface of the casing. The column can be pivoted to an extended position for holding the screen in an extended state. The column includes a plurality tubular members which slide with respect to each other. A lowermost tubular member has a first column lock mechanism for engaging the lowermost tubular member with an adjacent, upper tubular member to maintain the column at a desired height. A column lock releasing mechanism including a pedal is provided for releasing the engagement between the lowermost tubular member and the upper tubular member.

25 Claims, 22 Drawing Sheets

(a)

(b)

PORTABLE SCREEN DEVICE

BACKGROUND OF THE INVENTION

1. Field of the Invention

The present invention relates generally to a screen for displaying, on an enlarged scale, an image projected by a projecting device such as a projector, and in particular, but not exclusively, to a portable screen device that is easy to carry and can be installed on a floor, a table, or the like.

2. Description of the Related Art

An image projected by a projector is generally displayed, on an enlarged scale, on a reflection type screen. Of such screens, some are generally accommodated in a housing mounted on a ceiling or a side wall, and are electrically or manually extended as occasion demands. Hanging screens or screens with a tripod are used by hanging or locating them at a desired place.

Recently, due to the increasing number of meetings or conferences in companies or offices, there is an increased demand for a portable screen device with a simple structure that is easy to carry with a projector which can be installed on a floor, a desk, or a table in a conference room to display an image projected by the projector. Due to this demand, portable screen devices are today available in which a screen is wound around a roll stored in housing. When such screen devices are in use, the housing is initially installed at a desired place, and the screen is subsequently extended by, for example, an extension means somewhat similar to a pantograph by the action of the biasing force of a spring mounted therein, or the screen is fastened to a column attached to the housing (for example, refer to JP Laid-open Utility Model Publication No. 6-36048).

There is also an increased demand for a portable screen device for in home use because of increased use of projectors for projecting a TV picture.

However, a portable screen device for home use must to be small and light in weight so that it can be easily carried by a woman or a child. Conventionally, when a portable screen device is put into a storage position, the screen is wound first and then the column is contracted; or the column is contracted while the screen is engaged with the column and, thereafter, the screen is removed from the column and wound. In the former case, the screen is manually removed from the tip end of the column and then is wound and, thereafter, the respective tubular members constituting the column are released from the engagement and pushed into one another to contract the column. In the latter case, the column is contracted at the back side of the screen and, then, the screen is removed from the tip end of the column and wound. In both cases it is difficult to put the screen device into a storage position. In particular in the former case, even an adult can not reach the tip end of the column to remove the screen from the column, because screen sizes have increased to 80 inches, 100 inches, and the like. The latter method, is problematic because a user must move to the back side of the screen to contract the column, and when the screen device is installed near a wall, the user must either move the screen device, or perform operations in a narrow space. Therefore, there is also a need for a simple structure which facilitates the operations for putting screen devices into a storage position, such as housing the screen in the storage case and contracting the column and the like.

SUMMARY OF THE INVENTION

The present invention was made in view of the aforementioned requirements and problems and aims to provide a portable screen device which has a smaller size, a lighter weight, and a simple structure which is easy to handle.

In order to overcome the aforementioned problems, a portable screen device according to the present invention includes: a casing having an opening extending in a longitudinal direction on the upper surface thereof, a spring-biased roll rotatably mounted to the casing; a screen wound around the spring-biased roll in storage, and pulled out from the opening in use; a top bar secured to one end of the screen which is used as a cover to close the opening in storage; and an extendable column having one end supported at a center portion of the back face of the casing for holding the screen in a stretched state. The column includes a plurality of tubular members which are slidable with respect to each other. A lowermost tubular member is provided with a first column lock mechanism for engaging the lowermost tubular member with a next tubular member which is pulled out from the lowermost tubular member, to maintain the column at a predetermined height. The column has a column lock releasing mechanism which releases the engagement between the lowermost tubular member and the next tubular member in conjunction with the pressing of a pedal.

Also, the first column lock mechanism may include an engaging receiving portion including a through hole formed in the upper end portion of the lowermost first tubular member, and an engaging portion which is placed in a concave portion of a sliding member mounted to the inner peripheral surface of the lower end portion of the next second tubular member. The engaging portion engages with the engaging receiving portion, and includes an engaging protruding portion for engaging with the through hole and a spring member which biases the engaging protruding portion.

The column lock releasing mechanism may include a pedal mechanism; a releasing portion placed on the side surface of the lowermost tubular member which moves forward from a securing position to a releasing position in which the lowermost tubular member and next tubular member are disengaged, or backward from the releasing position to the securing position in the longitudinal direction of the tubular member; the and a coupling portion for transferring an operation force from the pedal mechanism to the releasing portion to move the releasing portion forward or backward in the longitudinal direction of the tubular member.

The pedal mechanism may include a pedal supported on the bottom surface of the casing pivotally that pivots about an axis of the casing and protrudes from the front surface of the casing. The coupling portion may include a transmission member including a supporting portion supported on the base portion of the lowermost tubular member through a spring member, and a push-up portion having one end engaged with the releasing portion, wherein the spring member biases said push-up portion in such a direction that the releasing portion returns to the securing position. When the pedal is pressed against the biasing force, the releasing portion is pushed in the direction toward the releasing position. The releasing portion may be a releasing bar placed on the side surface of the lowermost tubular member so as to be capable of moving in the longitudinal direction of the tubular member and having a tapered cross-sectional area at its tip end. When the releasing portion is moved forwardly to the releasing position, the tip end comes into contact with the engaging protruding portion and pushes the engaging protruding portion into the concave portion of the sliding member, thereby releasing the first column lock mechanism.

Also, in the portable screen device according to the present invention, the column may include three tubular members and a second column lock mechanism for engaging the uppermost, third tubular member with a middle, second tubular member. The second column lock mechanism includes an engaging receiving portion including a through hole formed in the upper end portion of the second tubular member, and an engaging portion which is placed in a concave portion of a sliding member mounted to the inner peripheral surface of the lower end portion of the third tubular member. The engaging portion is engageable with the engaging receiving portion, and includes an engaging protruding portion for engaging with the through hole and a spring member biasing the engaging protruding portion. When the foot pedal is pressed, the first column lock mechanism is released causing the first tubular member to descend, the engaging protruding portion of the third tubular member to contact with the tip end of the releasing portion, and the engaging protruding portion to be pushed into the concave portion of the sliding member, thereby releasing the second column lock mechanism.

A piston portion which can slide within the first tubular member may be placed on the lower portion of a sliding member mounted to the inner peripheral surface of the lower end portion of the second tubular member and a first exhaust portion may be provided through the base portion of the first tubular member, so that the first tubular member and the second tubular member constitute a first air damper. When the second tubular member is dropped and descends into the first tubular member, the air pressure within the first tubular member, temporarily increases and the increased air pressure forms an air cushion. The air cushion can reduce the dropping velocity of the second tubular member and can stop the second tubular member. Also, a second exhaust portion may be provided through the upper portion of the sliding member in the second tubular member, and a piston portion which is slidable within the first tubular member may be placed on the bottom portion of a sliding member mounted to the inner peripheral surface of the lower end portion of the third tubular member, so that the second tubular member and the third tubular member constitute a second air damper, to exhaust air within the second tubular member.

Also, the portable screen device according to the present invention include a hoisting/lowering mechanism constituted by a gas spring. The gas spring can be placed within a lower tubular member for hoisting and lowering an upper tubular member next to the lower tubular member.

The gas spring may include a cylinder being capable of moving up and down integrally with the upper tubular member and a piston rod capable of sliding within the cylinder in the axial direction. The hoisting/lowering mechanism may further include a single pulley supported on the upper end portion of the cylinder, and a wire stringed around the pulley. The wire may be secured to the lower end portion of the piston rod at one end, and secured at the other end to a sliding member mounted to the inner peripheral surface of the lower end portion of the upper tubular member so that it is tensioned. Further, the column may be include three tubular members, and the piston rod may be secured at its lower end portion to the upper portion of a sliding member in the second tubular member, while the cylinder is engaged at its lower end portion, with a sliding member mounted to the inner peripheral surface of the lower end portion of the uppermost third tubular member so that the third tubular member can be hoisted and lowered by the upward and downward movements of the cylinder.

Further, in the portable screen device according to the present invention, a hanging member may be secured to the center portion of the top bar, and a hook portion may be provided at the upper end portion of the column, such that the hanging portion can be hung on the hook portion. Further, a carrying handle may be provided on the top bar such that it is spaced from the hanging member and from the center portion in the extending direction of the column. Further, the hanging member may serve as a carrying handle. Also, the hook portion may be pivotally mounted to the upper end portion of the column such that when the supported column is laid down, the hook portion can be rotated such that it comes into intimate contact with the casing.

Further, the portable screen device according to the present invention may include a lock mechanism for securing the top bar to the casing at a storage state. Further, the lock mechanism may be a sliding-type lock mechanism including a cover member having, at its tip end, a claw portion and coupled, at the other end, to a pivotal shaft through an idler shaft; and an engaging portion which engages with the claw portion. The cover member and the engaging portion may be placed to sandwich the opening portion of the casing. Further, there may be a spring member for maintaining the cover member in opened position. The spring member may be wound around the idler shaft and the pivotal shaft in an S shape and to with the casing at one end and with the cover member at the other end.

The portable screen device of the present invention, may also include a column lock releasing mechanism which releases the engagement between the lowermost tubular member and the next tubular member in conjunction with the pressing of the pedal. This enables the column to be contracted by a single pedal-pressing operation, thereby enabling easy storage. Particularly, since the pedal protrudes from the casing to the front side, it is possible to contract the column at the front side of the screen, which enables the screen device to be easily put into storage, without requiring someone to move to the back side of the screen.

Further, since the top bar also serves as a cover member, provision of another cover member is unnecessary, thereby reducing the weight of the screen device. Furthermore, since the column is integrated with the casing and pivotable, it is possible to lay down the column at a storage state, which can further reduce the size of the screen device. This makes the screen device easier to carry. Further, in use, the column is erected and extended to a desired height to hold the screen. When the screen device is put into storage, the column is contracted and laid down, the screen is wound, and the opening portion is covered with the top bar. Thus, the screen device is easy to handle.

DETAILED DESCRIPTION OF THE INVENTION

Hereinafter, embodiments of the present invention will be described, with reference to the drawings.

First Embodiment

Figure 1:
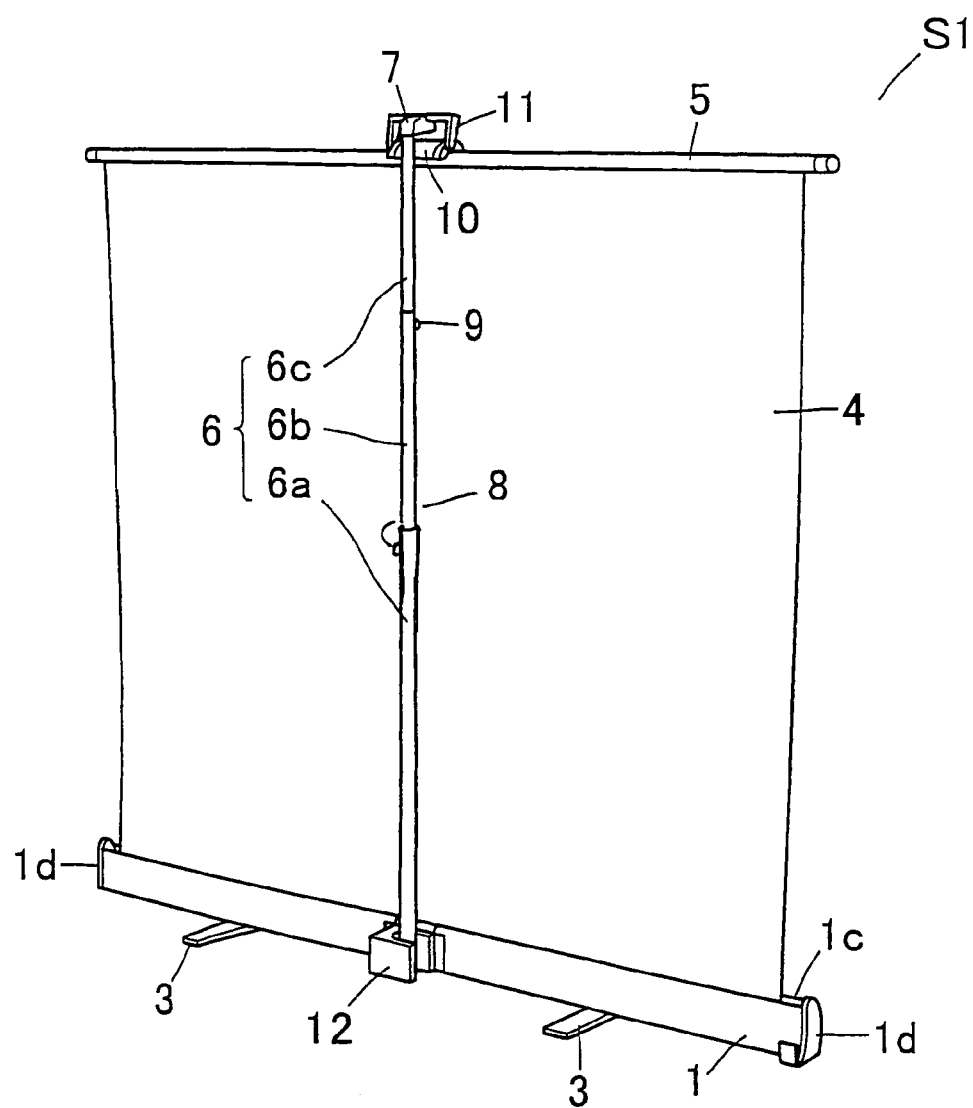
FIG. 1 is a schematic perspective view illustrating an exemplary portable screen device according to a first embodiment of the present invention in use.

FIG. 1 illustrates a portable screen device according to the present invention during use thereof. The portable screen device S1 includes a casing 1 having a pair of caps 1d at its opposite ends, a spring-biased roll (not illustrated) mounted within a casing, a screen 4 pulled out from an opening portion 1c and extended between a top bar 5 and the spring-biased roll, and a column 6 constructed approximately at the center of the back surface of the casing 1 which maintains the screen 4 at a desired height. The column 6 is configured by three stages of tubular bodies 6a, 6b, and 6c which are supported by a column fitting member 12 attached approximately at the center of the casing 1. The column 6 can be slidably extended and contracted, and is maintained at a desired height by a first column lock mechanism 8 and a second column lock mechanism 9. In addition, the column 6 has a hook portion 7 horizontally rotatably attached at the center of the column. The screen 4 is suspended by hooking a carrying handle 11 at the hook portion 7. The handle is disposed at the center of the top bar 5 and also used as an engaging member. In addition, an engaging portion 10 functions as a locking mechanism for fixing the top bar 5 at the casing 1 In a storage position, the locking mechanism is engaged with an engaged portion (not illustrated) disposed in the casing 1. In addition, the screen device S1 is supported by a pair of legs 3 pulled out from the bottom of the casing 1 so that the screen device can stand in an erected state.

Herein, the projection surface of the screen is referred to as a front surface of the screen. Further, the side of the casing near the projection surface of the screen is referred to as a front surface of the casing, while the side of the casing near the back surface of the screen is referred to as a back surface of the casing.

Figure 2:
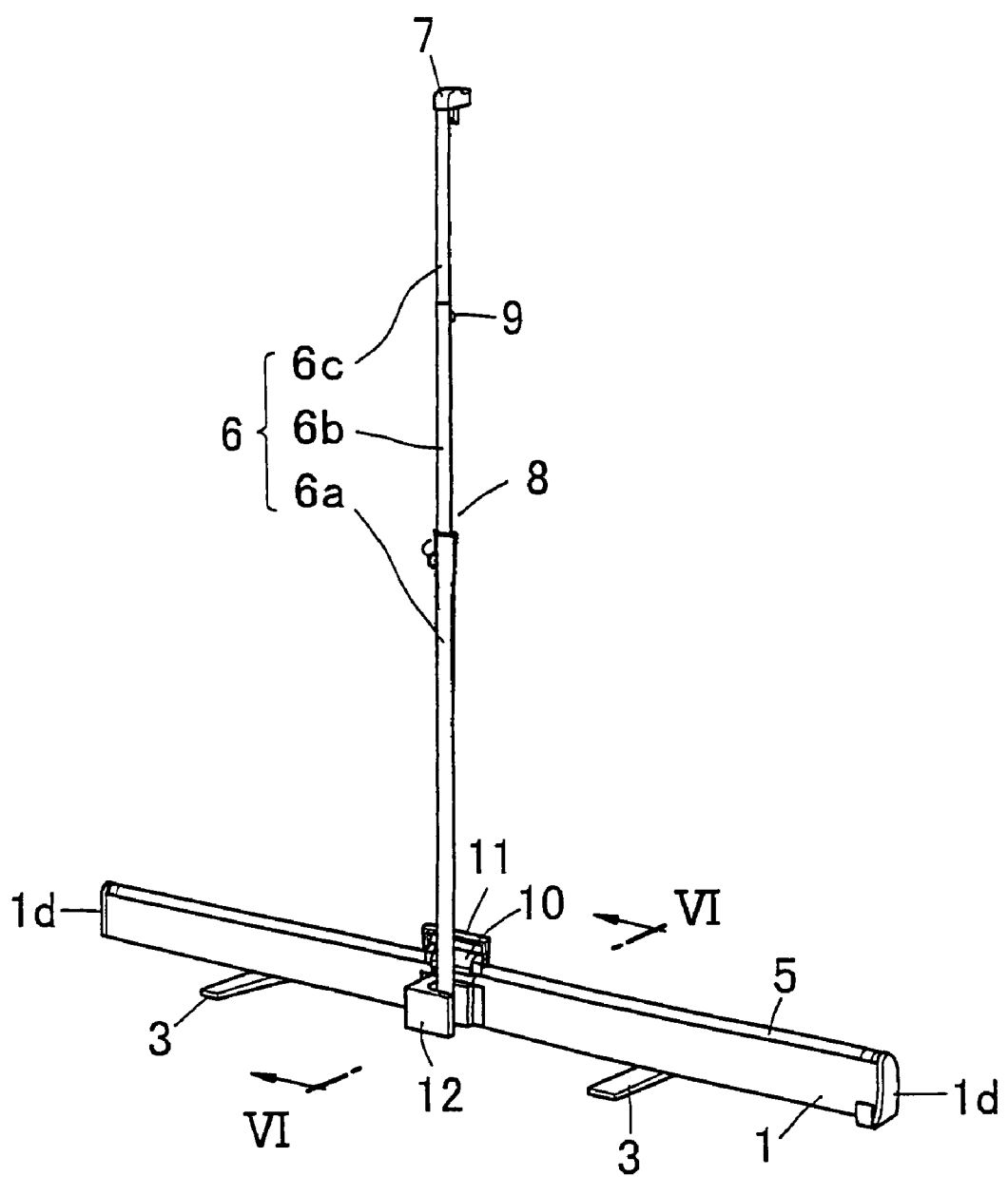
FIG. 2 is a schematic perspective view illustrating the portable screen device of FIG. 1, shown in the state that a screen is wound.
Figure 3:
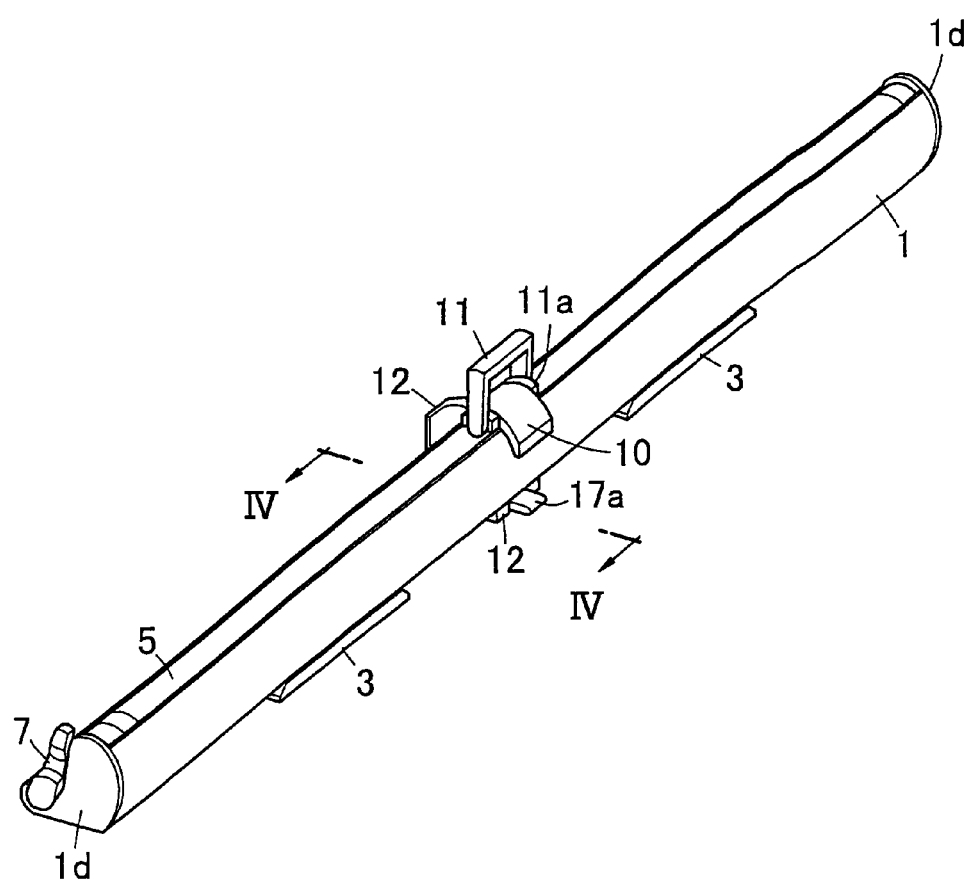
FIG. 3 is a schematic perspective view illustrating the portable screen device of FIG. 1, shown in the stored state.

FIG. 2 illustrates the portable screen S1 with the screen 4 turned back for storage. The screen 4 is released from the engagement with the hook portion 7, and then turned back to be housed in the casing 1. The top bar 5 closes the opening of the casing 1 as a cover body. FIG. 3 illustrates the portable screen S1 in storage. In FIG. 3, the column 6 is rotated around the lower end that is pivoted at the column fitting member 12 to be folded. Thereby, the column 6 is stored with the entire column in parallel with the casing 1. The lock mechanism 10 is engaged with the to-be-engaged portion (not illustrated) placed on the casing 1 so that the top bar 5 is secured to the casing. Further, a pedal 17a, which is a portion of a column lock releasing mechanism, is placed at the center portion of the front surface of the easing to protrude therefrom.

Figure 4:
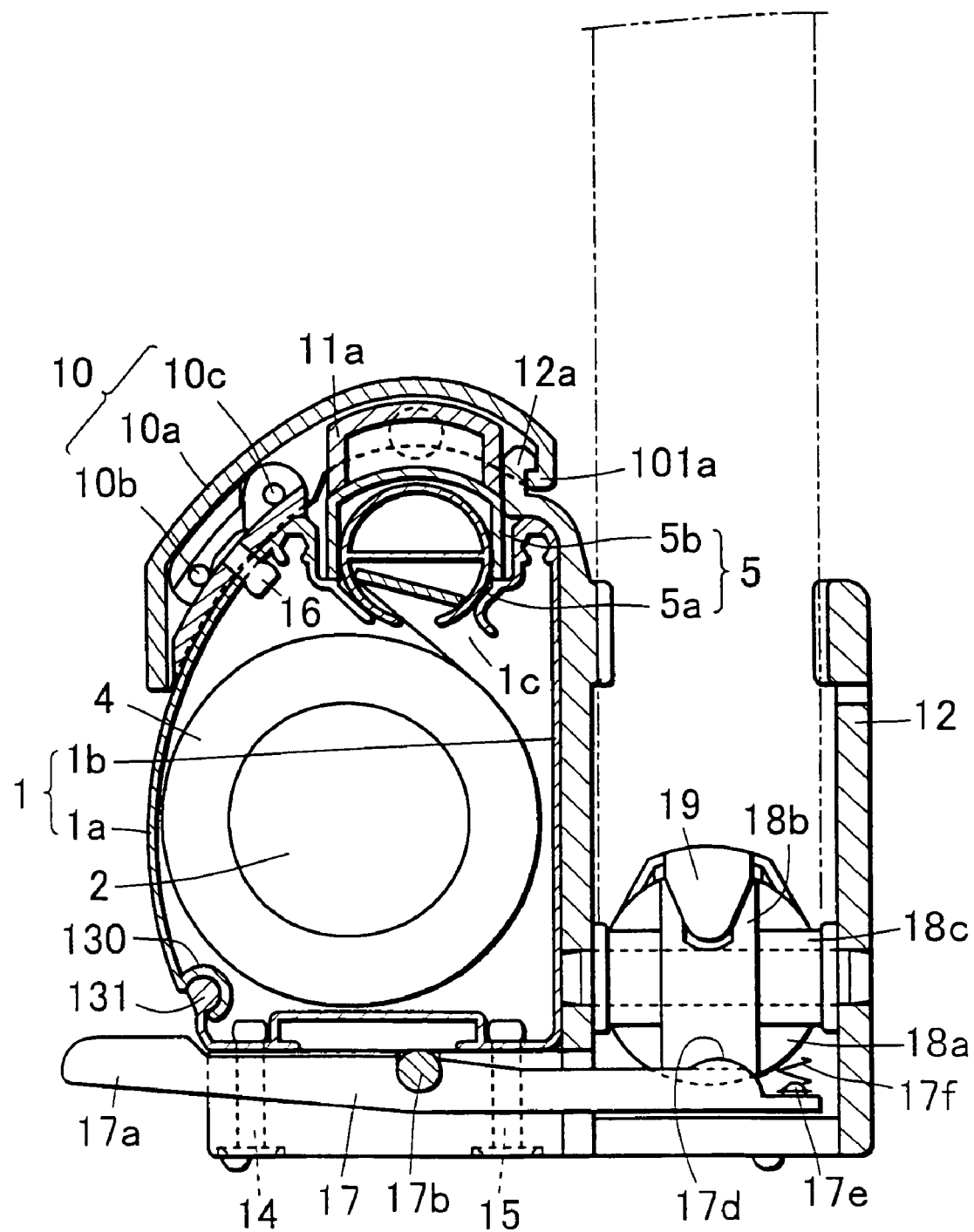
FIG. 4 is a schematic longitudinal cross-sectional view taken along the line IV-IV in FIG. 3.

FIG. 4 is a longitudinal cross-sectional view taken along the line IV-IV in FIG. 3. The casing 1 is constituted by a first case member 1a and a second case member 1b each extending in a longitudinal direction. In the longitudinal direction, first ends of these two case members are hingedly coupled to each other at one side of the casing so as to be capable of being opened and closed, and the other ends thereof are separated from each other to form an opening 1c for pulling out the screen. The first case member 1a is disposed on the front face which faces the projector and has a curved structure extending toward the projector. The second case member 1b is disposed on the rear face and has a L-shape. Thereby, it is possible to store the spring-biased roll 2 on which the screen 4 is wound in the casing 1 and also to make the width of the opening 1c narrow, thereby reducing the size of the casing 1. Further, an aluminum extruded material can be used as the casing member. Further, the casing is not limited to separate first and second case members coupled to each other, but may be an integrally formed casing.

FIG. 4 illustrates a one-sided hinge structure constituted by a fitting concave portion 130 formed by a circularly bent portion at one end of an edge portion of the first case member 1a, and a fitting protruding portion 131 with a substantially D-shaped cross-sectional area at one end portion of an edge portion of the second case member 1b, wherein the fitting protruding portion 131 can be pushed and fitted into the fitting concave portion 131. On the other hand, the fitting protruding portion 131 can be formed to have a circular cross-sectional area, and the fitting protruding portion 131 can be slid and fitted into the fitting concave portion 130 in the longitudinal direction of the first case member 1a or second case member 1b to form a one-sided hinge structure. However, it is more preferable to employ a D-shaped fitting protruding portion 131, which enables coupling the first case member 1a and the second case member 1b with each other through an easy pushing operation.

Figure 5:
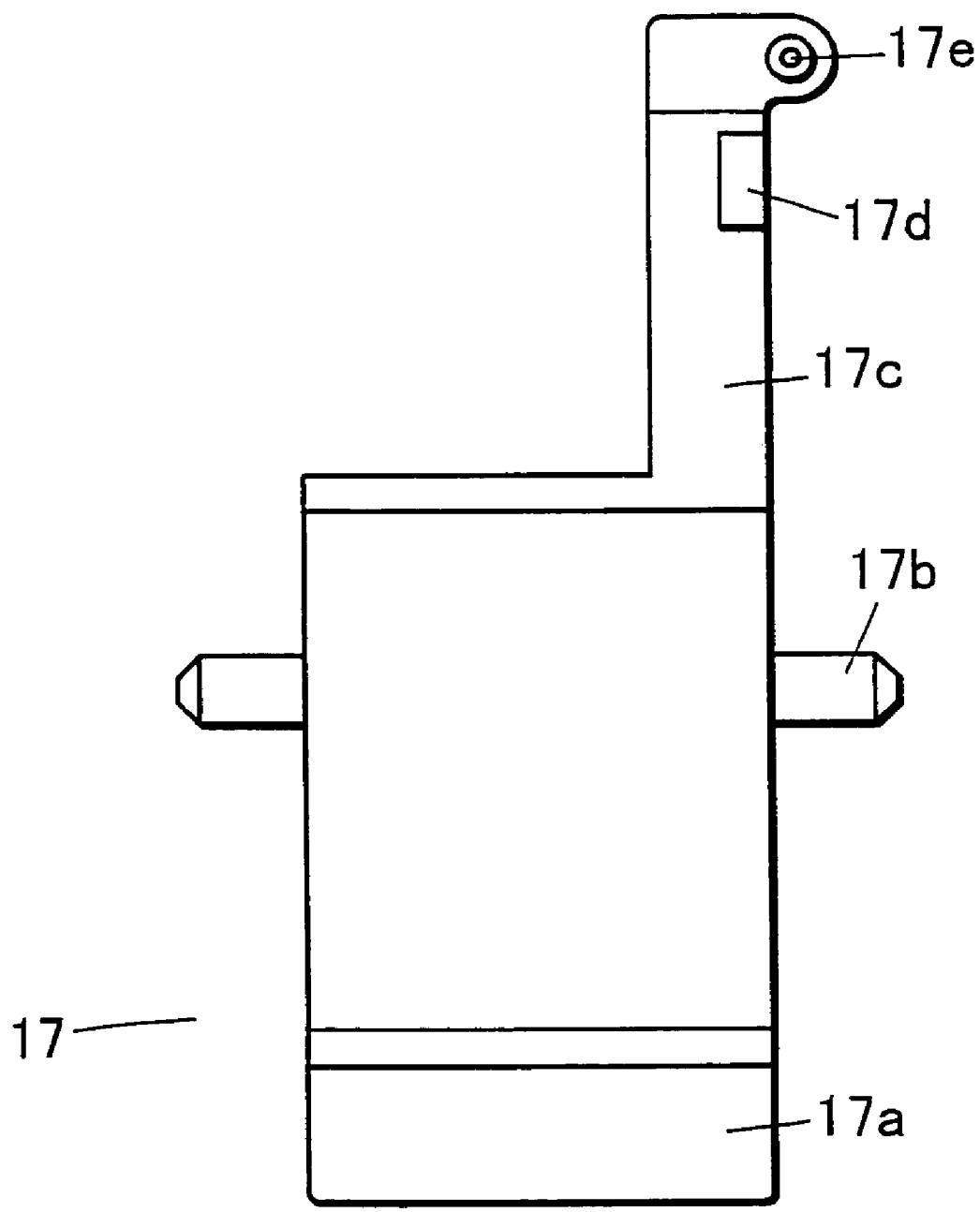
FIG. 5 is a perspective plan view illustrating an exemplary pedal mechanism for use in the portable screen device of FIG. 1.

The column fitting member 12 for supporting the column 6 is mounted to the back surface of the casing 1. The column fitting member 12 is fastened and secured to the bottom portion of the casing 1 with rivets 14 and 15. On the bottom surface of the casing, there is placed a pedal mechanism 17 pivotally supported about an axis of the casing, wherein the pedal mechanism 17 includes the pedal 17a protruding from the front surface of the casing. As illustrated in a schematic plan view of FIG. 5, the pedal mechanism 17 includes the pedal 17a at one end, a swaying portion 17c which is formed from a protruding piece with a small width and swings in the upward and downward directions at the other end thereof, and a shaft portion 17b which causes the pedal 17a and the swaying portion 17c to move in conjunction with each other. Further, the swaying portion 17c includes a push-up portion 17d which operates a releasing portion which will be described later, and a first spring engaging portion 17e which engages with an end of a restoring spring 17f for applying a restoring force to the pedal. When the screen device is put into storage, the other end of the restoring spring is engaged with a second spring engaging portion (not illustrated) provided in the column fitting member, so that the pedal is restored to a standby position through the biasing force of the restoring spring.

The lock mechanism for securing the top bar to the casing can be, for example, a sliding-type lock mechanism. The lock mechanism 10 is constituted by a cover member 10a having a claw portion 101a at one end. An engaging portion 12a engages with the claw portion 101a, when the cover member 10a and the engaging portion 12a are placed to cover the opening portion of the casing. It is only necessary that the engaging portion 12a faces the cover member across the opening portion of the casing. The engaging portion 12a can be, for example, a protrusion provided at an edge portion of the column fitting member near the back surface of the casing. The cover member 10a is coupled at the other end thereof to a pivotal shaft 10c through an idler shaft 10b. The pivotal shaft 10c is secured to the casing through a rivet 16. In order to release the lock mechanism, the rear end of the cover member 10a is pressed to move the cover member 10a forward for releasing the engagement between the claw portion 101a and the engaging portion 12a and, then, the cover member 10a is rotated about the pivotal shaft 10c to be withdrawn. For example, as shown in FIG. 4, the cover member 10a is rotated in the counter-clockwise direction. At this time, the cover member 10a is moved slidably backward and restored to a standby position, through the idler shaft 10b. On the other hand, in order to lock the cover member, the cover member is pushed out from the standby position and moved forward until it overlies the engaging portion and, then, the cover member is moved to a lock position to cause the claw portion to engage with the engaging portion.

Figure 6:
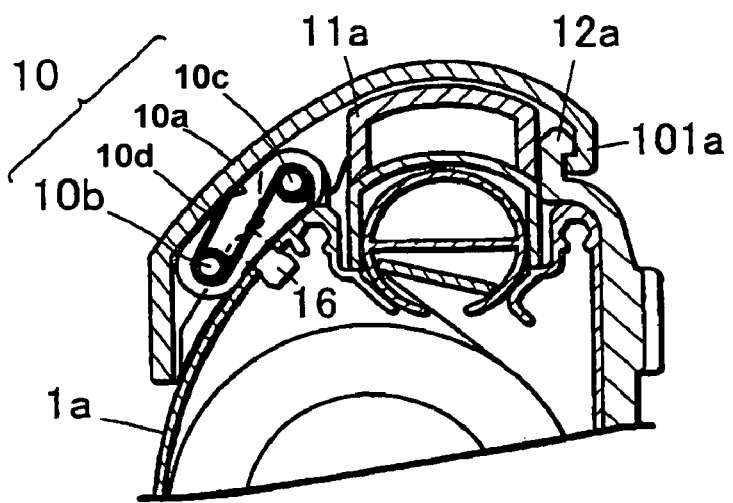
FIG. 6 is a schematic cross-sectional view illustrating exemplary operations of a lock mechanism for securing a top bar, wherein (a) illustrates a usage state and (b) illustrates a releasing state.
Figure 6:
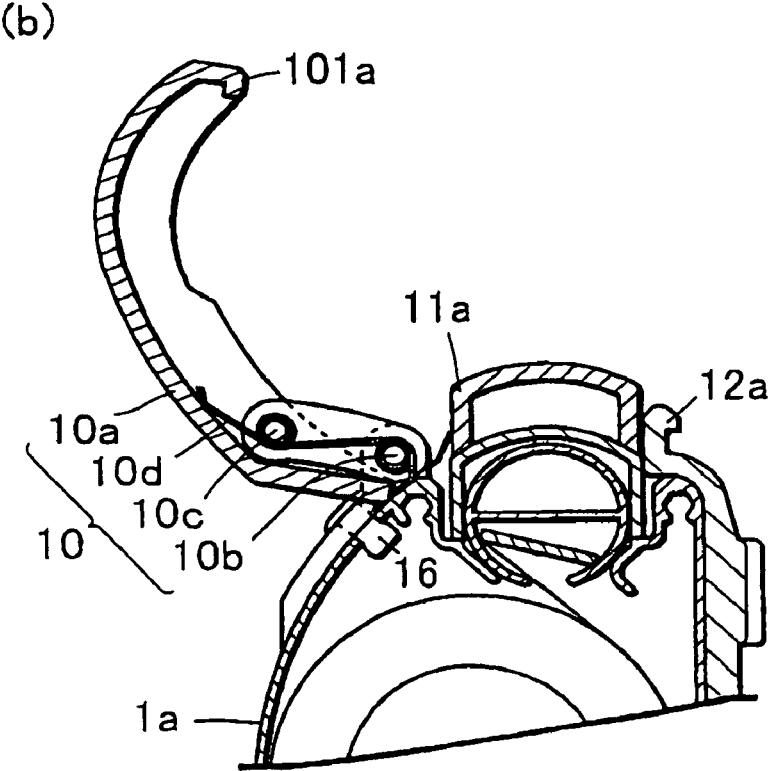

In this case, the lock mechanism can be provided with a spring member for maintaining the cover member in an opened position. FIG. 6 is a schematic cross-sectional view illustrating operations of the lock mechanism provided with such a spring member, wherein (a) illustrates a secured state, namely a state where the cover member is secured, while (b) illustrates a released state, namely a state where the cover member is released. The spring member 10d is wound around the idler shaft 10b and the pivotal shaft 10c in an S shape, such that it comes into contact with the first case member 1a at one end and with the cover member 10a at the other end thereof. At the secured state, due to the engagement between the claw portion 101a and the engaging portion 12a, the other end of the spring member 10d contacts with the cover member 10a while being elastically deformed by the pressing force of the cover member 10a. On the other hand, if the engagement between the claw portion 101a and the engaging portion 12a is released, the other end of the spring member 10d is no longer elastically deformed and the cover member 10a rotates about the idler shaft 10b, which functions as a fulcrum. The cover member 10a is maintained open due to the biasing force of the spring member 10d which contacts therewith. This prevents the cover member from overlying the top bar, thereby enabling easy grasping of the handle when the lock mechanism is released.

Further, the lock mechanism is not limited to the sliding-type lock mechanism, and it is possible to employ various types of lock mechanisms capable of engaging engageable members with each other across the opening portion of the casing.

Figure 7:
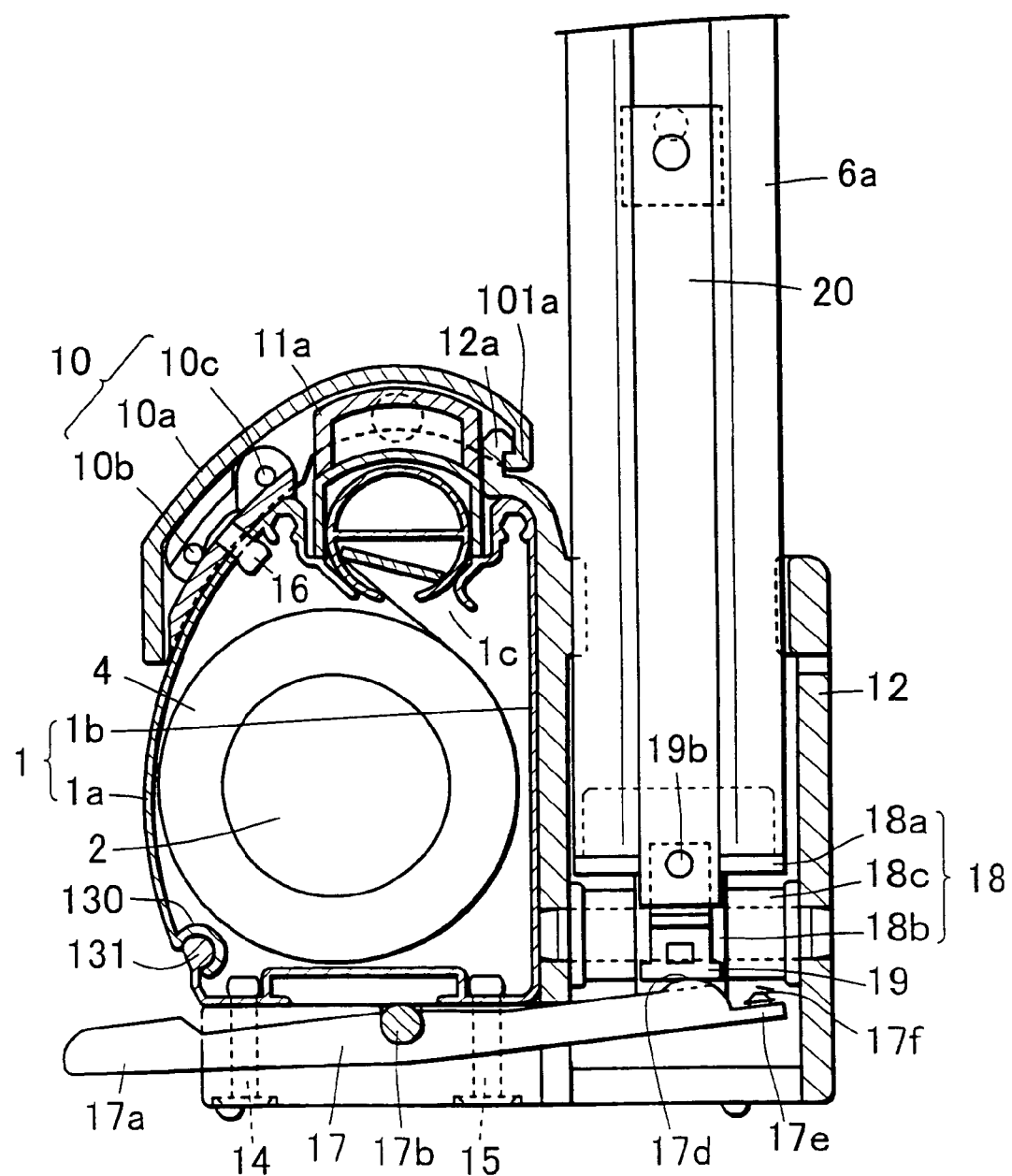
FIG. 7 is a schematic longitudinal cross-sectional view taken along the line VI-VI in FIG. 2.
Figure 8:
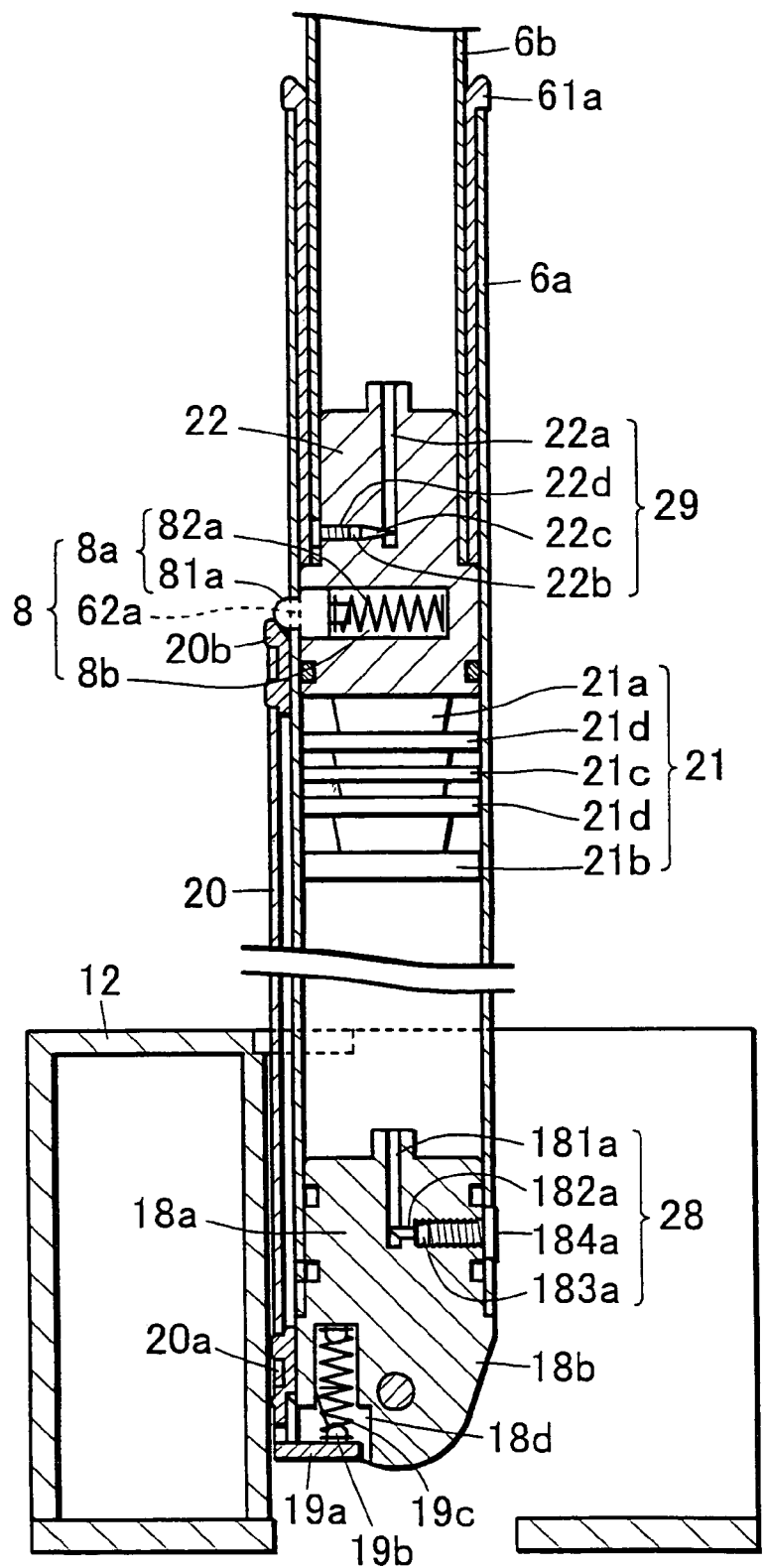
FIG. 8 is a schematic cross-sectional view of the column in FIG. 2.
Figure 9:
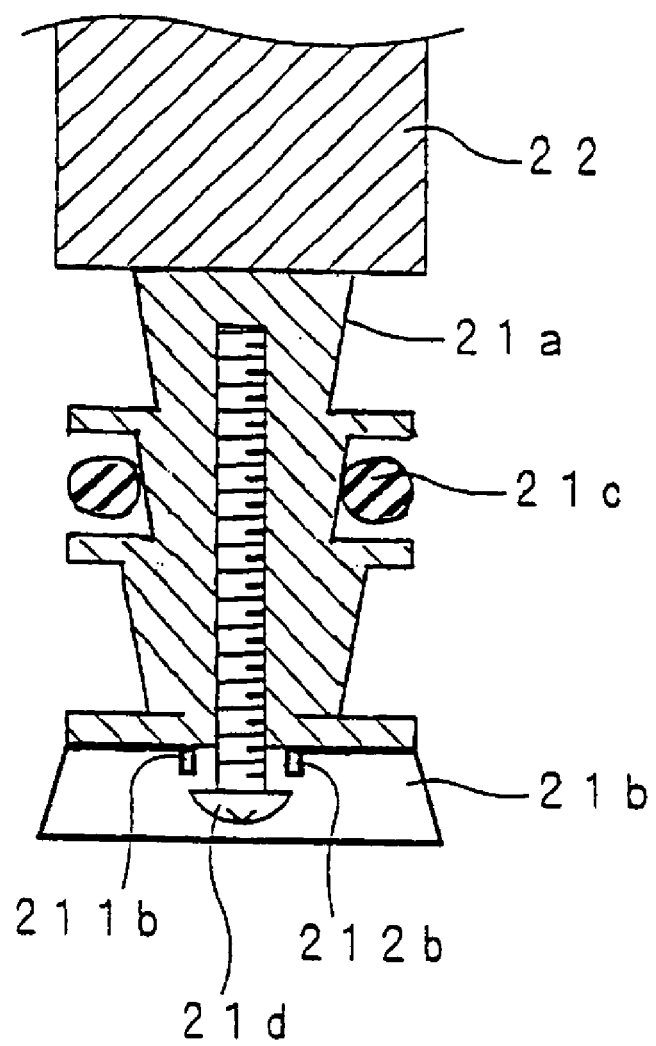
FIG. 9 is a schematic enlarged cross-sectional view of the piston portion in FIG. 8.

FIG. 7 is a schematic longitudinal cross-sectional view taken along the line VI-VI in FIG. 2 illustrating a state wherein the column is erected and the pedal is pressed. Further, FIG. 8 is a schematic cross-sectional view of the column in FIG. 2. Further, FIG. 9 is a schematic enlarged cross-sectional view of the piston portion. A supporting member 18 is fitted to the bottom portion of the first tubular member 6a. The supporting member 18 includes a top portion 18a fitted to the first tubular member 6a and a bottom portion, wherein the bottom portion includes a shaft portion 18c pivotally supported by the column fitting member and a base portion 18b for supporting the shaft portion.

As shown in FIG. 8, there is, a sliding member 22 is mounted on the inner peripheral surface of the second tubular member 6b at its lower end portion, and a first column lock mechanism 8 including a tubular engaging portion 8a placed within a concave portion 8b of the sliding member 22. The tubular engaging portion 8b is constituted by an engaging member 81a. A spring member 82b which engages with the concave portion 8b at one end, and engages with the engaging member 81a at the other end thereof for biasing the engaging member 81a. A through hole 62a is formed in the longitudinal direction through the upper end portion of the first tubular member 6a, and this through hole forms a tubular engaging receiving portion which engages with the tubular engaging portion 8a. The engaging member 81a has a ball-shaped protruding portion at its tip end, and the spring member 82a presses the engaging member 81a to cause the ball-shaped protruding portion to engage with the through hole 62a, thereby securing the second tubular member 6b. In order to release the engagement, it is possible to directly press the ball-shaped protruding portion against the biasing force of the spring member 82a, or push the second tubular member 6b down for indirectly pushing the ball-shaped protruding portion into the concave portion 8b. The ball-shaped protruding portion can be made of either a metal or a resin, but it is preferable to employ a ball-shaped protruding portion made of a resin. Further, the edge portions of the through hole can be rounded or tapered such that they are gradually widened toward the second tubular member 6b. This can reduce the frictional force between the through hole and the engaging member. This enables easily releasing of the engagement by pulling or pressing the second tubular member 6b from or into the first tubular member 6a, without directly pushing the ball-shaped protruding portion. Further, an outer peripheral groove is formed in the sliding member 22 and a sliding ring 30 which serves as a packing is placed within the outer peripheral groove.

A column lock releasing mechanism is constituted by a pedal mechanism 17, a releasing portion 20 placed on the side surface of the first tubular member 6a which is moveable in the longitudinal direction of the tubular member, and a coupling portion 19 which transfers an operation force from the pedal mechanism 17 to the releasing portion 20. The releasing portion can be made of, for example, a long releasing bar. On the other hand, the coupling portion is constituted by a coupling member 19 including an engaging end portion 19b which engages with a to-be-engaged portion 20a at the lower end portion of the releasing bar 20, and a supporting member 19a for supporting the engaging end portion 19b. For example, the coupling portion is constituted by an L-shaped coupling member. A releasing spring 19c, which biases the releasing bar engaged therewith toward the bottom portion of the tubular member, is engaged at its one end with an end portion of the L-shaped coupling member. The releasing spring 19c is housed in a concave portion 18d provided in the base portion 18b of the column supporting member 18, and the other end portion of the releasing spring 19c is also engaged with the inner side of the concave portion. If the pedal 17a is pressed, the push-up portion is bought into contact with the supporting member 19a of the coupling member 19 against the biasing force of the restoring spring 17f, which pushes the supporting member 19a upwardly against the biasing force of the releasing spring 19c. This causes the releasing bar 20 engaged with the coupling member 19 to be pushed upwardly and moved forward in the longitudinal direction along the side surface of the first tubular member. The releasing bar 20 has an upper end portion 20b having a tapered cross-sectional area. If the releasing bar 20 is moved forward up to a releasing position in which the upper end portion 20b comes into contact with the ball-shaped protruding portion of the first column lock mechanism 8, then the upper end portion 20b pushes the ball-shaped protruding portion into the concave portion 8b, thereby releasing the first column lock mechanism. Although FIG. 7 illustrates a state in which the screen is housed, during utilization the screen is engaged with the hook portion of the column, and if the first column lock mechanism is released, then the second tubular member 6b descends to be housed in the first tubular member 6a due to the load of the screen.

When the second tubular member 6b descends, the second tubular member 6b and the first tubular member 6a can constitute an air damper, which enables reducing the speed of the second tubular member 6b for gradually dropping the second tubular member 6b. Namely, as illustrated in FIG. 8, at the lower portion of the sliding member 22 placed at the lower end portion of the second tubular member 6b, there is a piston portion 21 which can be slid within the first tubular member at a hermetic state. Further, a first air exhaust portion 28 is provided in the supporting member 18 at the bottom portion of the first tubular member to enclose the air within the first tubular member 6a through the piston portion 21 for forming a first air damper. The first air exhaust portion 28 is constituted by an air exhaust hole 181a which is formed in the axial direction through the top portion 18a of the supporting member 18, and is opened to the inside of the first tubular member 6a by a leak groove 183a communicated with the air exhaust hole 181a through a communication hole 182a, and a leak valve 184a which is threadably engaged within the leak groove. A leak hole (not illustrated) is formed in the leak valve 184a, which enables the amount of air exhausted through the leak hole to be changed by changing the degree of screwing the leak valve. Further, the piston portion 21 is constituted by a counter-tapered rod 21a having a smaller diameter at its side near the first tubular member which is mounted to the bottom portion of the sliding member 22, a piston packing 21b which is mounted to the lower end portion of the rod 21a to slidably contact with the inner peripheral surface of the first tubular member 6a, and one or more cushion rings 21c held movably in the vertical direction between a pair of annular-shaped protruding portions 21d formed on the rod 21a. As illustrated in FIG. 9, the piston packing 21b is made of a flexible material having a conical trapezoidal shape with a center axial hole 211b, and supported on the rod 21a through a supporting member 21d with a gap provided therebetween such that the piston packing 21b is rotatable and movable in the axial direction. Plural protruding portions 212b are erected around the axial hole 211b to prevent the piston packing 21b from coming into contact with the supporting member 21d. When the second tubular member descends, the piston packing is moved upwardly in the axial direction to come into intimate contact with the rod, thereby pressing the air within the first tubular member. On the other hand, when the second tubular member is pulled out, the piston packing is moved downwardly in the axial direction and is released from the intimate contact with the rod. At this time, the protruding portions prevent the piston packing from coming into contact with the supporting member, which allows air within the first tubular member to move through the axial hole, thereby reducing the air pressure within the tubular member and enabling easily pulling out the second tubular member.

Further, the cushion ring 21c slides on the inner peripheral surface of the first tubular member to increase the braking force of the piston portion. The cushion ring 21 may be, for example, an O-ring. The cushion ring 21c is held movably in the vertical direction between the pair of annular-shaped protruding portions 21d formed in the rod 21a and, when the second tubular member is pushed, the cushion ring 21c is intimately held on a larger diameter portion of the rod to increase the frictional force between the cushion ring 21c and the inner peripheral surface of the first tubular member. On the other hand, when the second tubular member is pulled out, the cushion ring is moved to a smaller diameter portion of the rod and is released from the intimate contact with the rod, thereby reducing the frictional force between the cushion ring 21c and the inner peripheral surface of the first tubular member. Accordingly, the second tubular member descends slowly and can be easily pulled out when it is used. Also, in order to enhance the braking effect, plural cushion rings can be employed. In this case, three or more annular protrusions can be provided.

Further, it is preferable to apply a lubricant such as an oil or grease to the lower portion of the sliding member 22. Such a lubricant reduces the friction between the sliding member and the first tubular member, thereby facilitating expansion and contraction of the column.

In this case, if the second tubular member 6b is dropped and is pushed into the first tubular member 6a, the air pressure within the first tubular member increases temporarily, and the increased air pressure forms an air spring. The air spring functions as a braking force against the second tubular member 6b, thereby causing the second tubular member 6b to be gradually dropped. Accordingly, even if the first column lock mechanism is released, the second tubular member is prevented from rapidly dropping and colliding against the bottom portion of the first tubular member to generate an repulsive sound. Further, by changing the degree of screwing the leak valve, it is possible to realize a desired dropping velocity. On the other hand, when the second tubular member 6b is pulled out from the first tubular member 6a, air is allowed to flow through the leak groove, which prevents the pulling out of the second tubular member 6b from being interfered.

Further, as illustrated in FIG. 8, a second exhaust portion 29 is formed through the upper portion of the sliding member 22. Also, a piston portion (not illustrated) which can slide within the second tubular member at a hermetic state can be provided at the lower portion of the third tubular member to constitute a second air damper. The piston portion of the second air damper, can have the same structure as the piston portion of the first air damper, except for absence of an exhaust portion. The second exhaust portion 29 is constituted by an exhaust hole 22a which is formed in the axial direction through the upper portion of the sliding member 22 and open to the inside of the second tubular member 6b by a leak groove 22b communicated with the exhaust hole 22a through a communication hole 22c, and a leak valve 22d which threadably engages with the leak groove 22b. The second exhaust portion has the function of exhausting air confined between the sliding member 22 in the second tubular member 6b and the third tubular member 6c through the gap between the first tubular member 6a and the second tubular member. If the amount of air confined between the first tubular member and the piston portion is reduced due to the descent of the second tubular member, the descending speed of the second tubular member will be decreased halfway through the descent thereof, which may induce an uncomfortable frictional sound. However, since air confined between the sliding member 22 in the second tubular member 6b and the third tubular member 6c is exhausted through the second tubular member 6b, it is possible to suppress the increase of the descending speed, which allows the second tubular member to descend at substantially a constant speed, thereby preventing the occurrence of an uncomfortable frictional sound. Further, a leak hole (not illustrated) is formed through the leak valve 22d, which enables changing the amount of air exhausted therethrough by changing the degree of screwing the leak valve.

Figure 10:
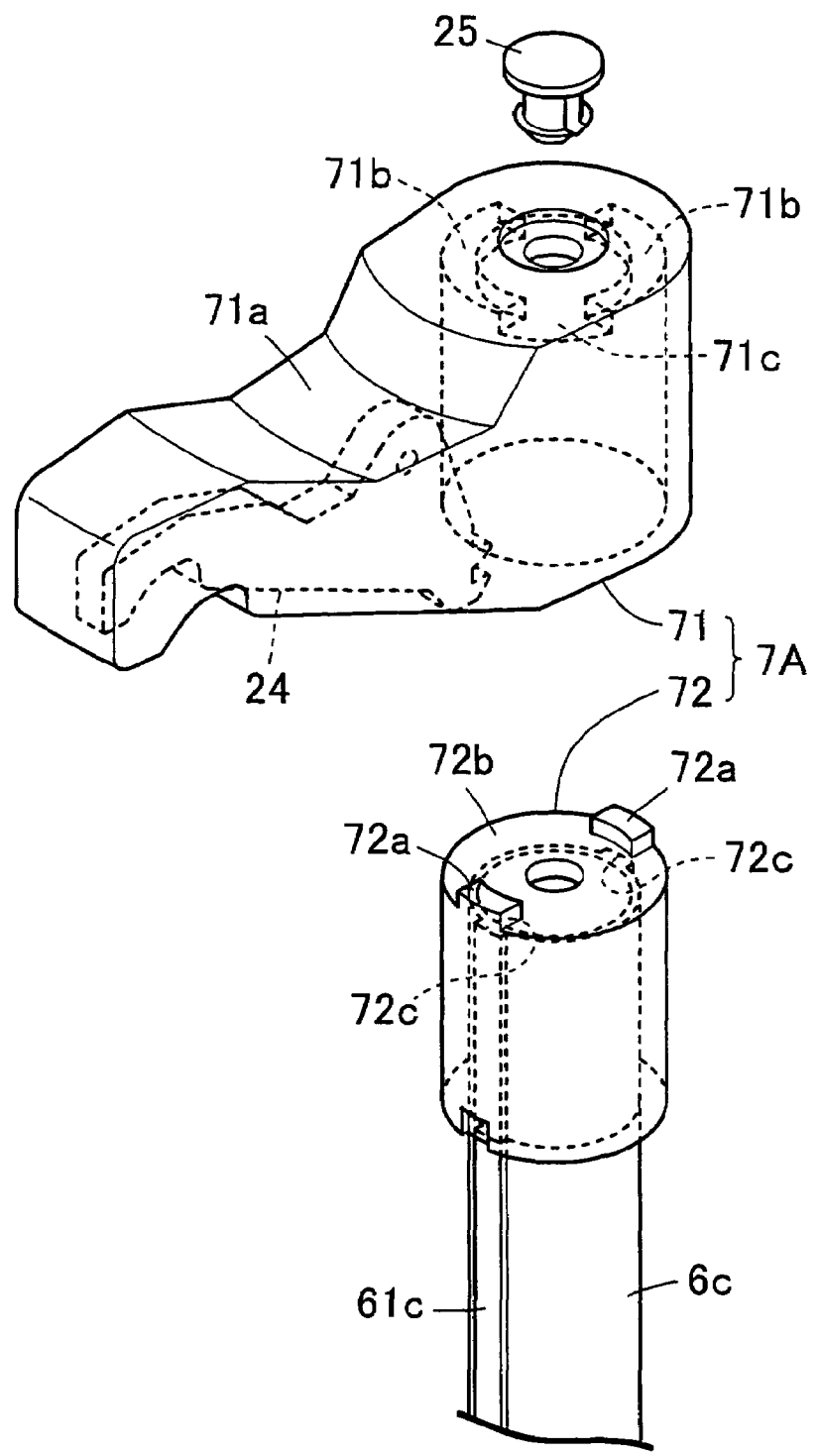
FIG. 10 is a schematic exploded perspective view illustrating the structure of a hook portion for use in the portable screen device of FIG. 1.

FIG. 10 is a schematic exploded perspective view illustrating an exemplary structure of the hook portion 7. The hook portion 7 includes a hook member 71 having, at a side portion thereof, an engaging portion 71a for engaging with the handle 11, a swaying member 24 which is placed within the engaging portion 71a and engaged with the upper end portion of the second tubular member, a supporting portion 72 which is concentrically inserted in the hook member 71 so that the hook member 71 is horizontally rotatably supported, and a coupling cap 25 which couples the supporting portion 72 and the hook member 71 to each other. The inner peripheral surface of the supporting portion 72 has a pair of protrusions 72c opposing each other. The protrusions have sliding protrusions 72a on the upper surface 72b. Engaging holes 61a are formed in the upper end portion of the second tubular member 6b, and the supporting portion 72 is fitted to the outer side of the upper end portion of the second tubular member 6b to engage the protrusions 72c with the engaging holes 61c. Thus, the supporting portion 72 is secured to the upper end portion of the second tubular member 6b. On the other hand, the supporting portion 72 is fitted in the hook member 71 such that the sliding protrusions 72a are positioned within guide grooves 71b provided in the ceiling portion 71c of the hook member 71 in the circumferential direction. The sliding protrusions 72a can reciprocate within the guide grooves 71b, which allows the hook member 71 to rotate between a usage position and a storage position.

Figure 11:
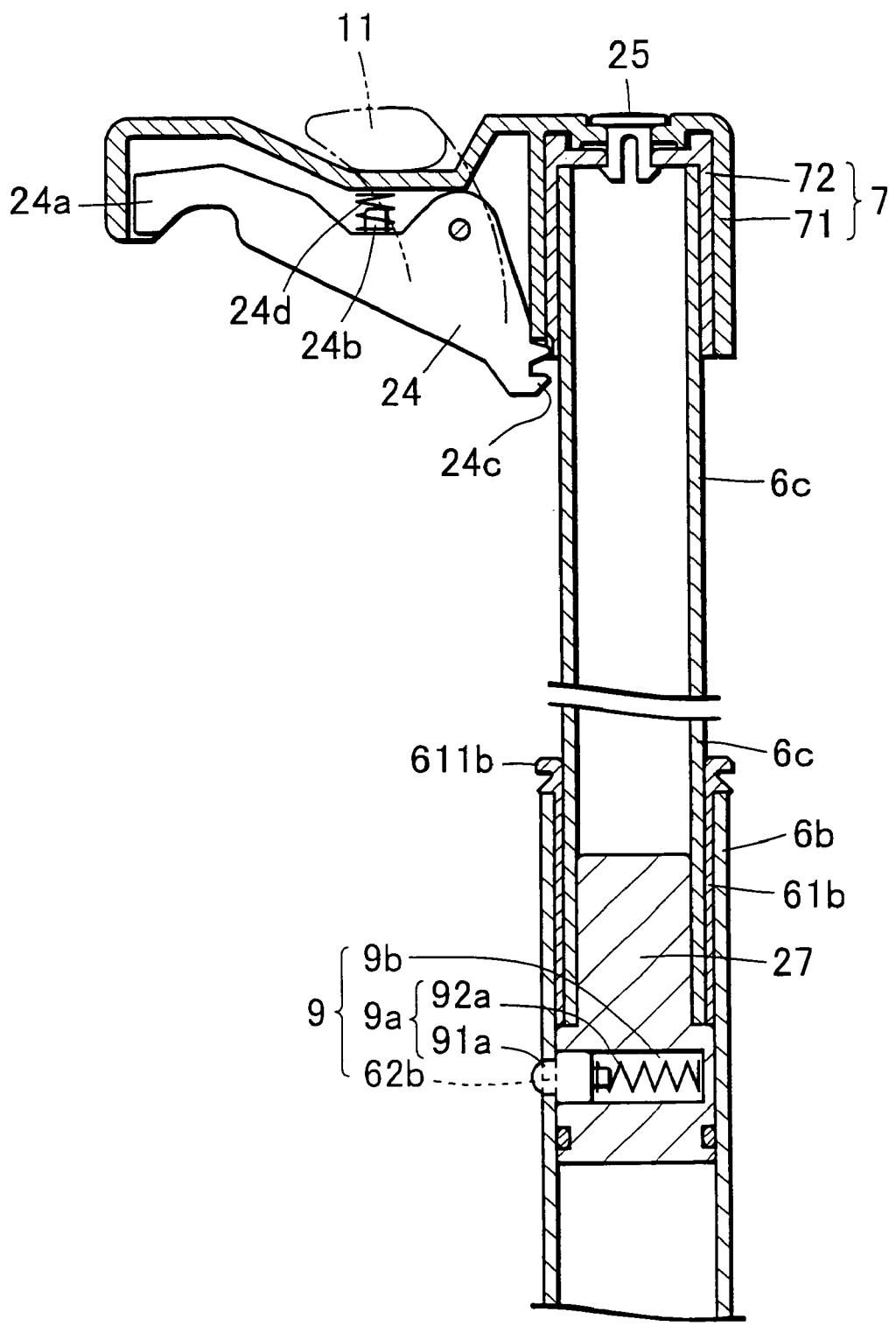
FIG. 11 is a schematic cross-sectional view of the structures of the hook portion and a second column lock mechanism for use in the portable screen device of FIG. 1.

FIG. 11 is a schematic cross-sectional view of the column extended to the longest length.

As shown in FIG. 11, a sliding member 27 is mounted on the inner peripheral surface of the third tubular member 6c at its lower end portion. A second column lock mechanism 9 includes a tubular engaging portion 9a placed within a concave portion 9b of the sliding member 27, wherein the tubular engaging portion 9a is constituted by an engaging member 91a and a spring member 92a which engages with the concave portion 9b at one end and engages with the engaging member 91a at the other end thereof for biasing the engaging member 91a. On the other hand, a through hole 62b is formed in the longitudinal direction through the upper end portion of the second tubular member 6b, and this through hole forms a tubular engaging receiving portion 62b which engages with the tubular engaging portion 9a. The engaging member 91a has a ball-shaped protruding portion at its tip end, and the spring member 92a presses the engaging member 91a to cause the ball-shaped protruding portion to engage with the through hole 62b, thereby securing the third tubular member 6c. The ball-shaped protruding portion may be pressed against the biasing force of the spring member 92a to release the engagement between the second and third tubular members. In this case, the ball-shaped protruding portion can be made of either a metal or a resin, but it is preferable to employ a ball-shaped protruding portion made of a resin. Further, the edge portions of the through hole 62b can be rounded or tapered such that they are gradually widened toward the third tubular member 6c. This can reduce the frictional force between the through hole and the engaging member. This enables the engagement to be easily released by pulling or pushing the third tubular member 6c from or into the second tubular member 6b, without directly pushing the ball-shaped protruding portion.

Figure 12:
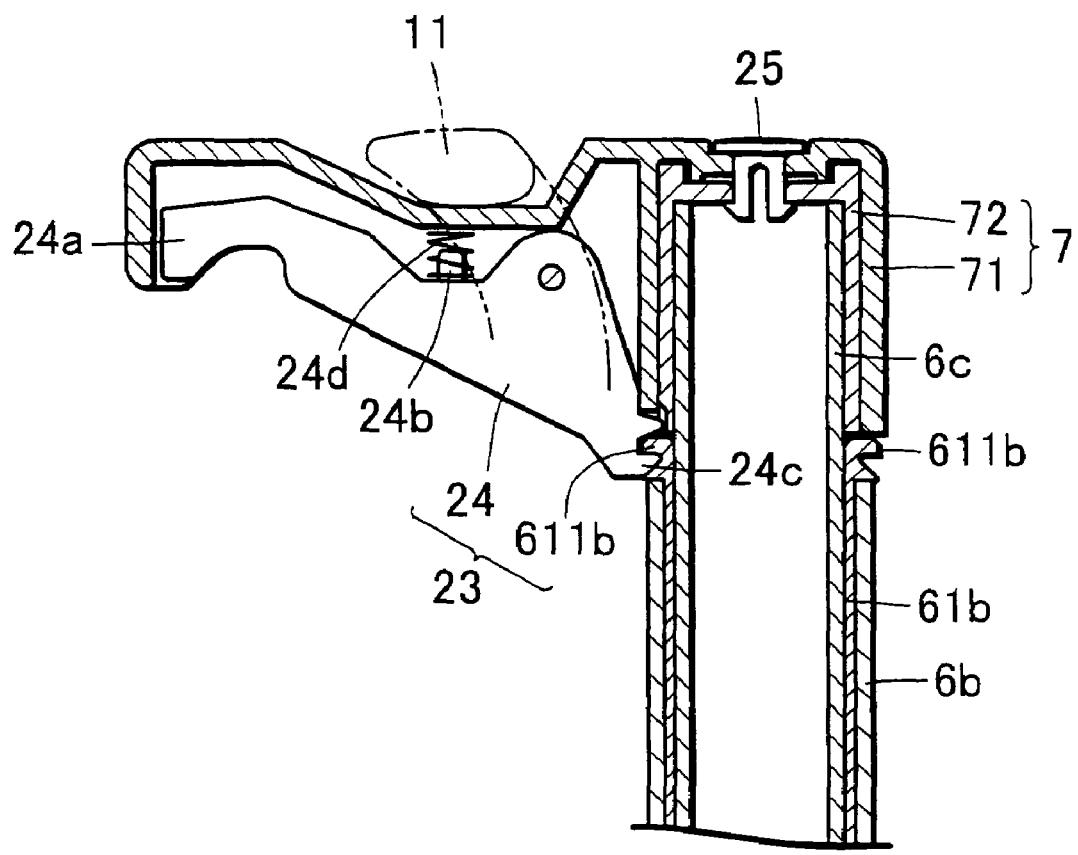
FIG. 12 is a schematic cross-sectional view of the structures of the hook portion and a third column lock mechanism for use in the portable screen device of FIG. 1.

On the other hand, FIG. 12 is a schematic longitudinal cross-sectional view illustrating a state where the third tubular member is engaged with and secured to the second tubular member. A third column lock mechanism 23 is constituted by the swaying member 24 loosely supported in the vertical direction within the engaging portion 71a of the hook member and a spacer member 61b fitted to the third tubular member 6c. The swaying member 24 includes a claw portion 24c which engages with an annular-shaped protruding portion 611b at the tip end of the spacer 61b at one end, a releasing lever 24a at the other end, and a shaft portion 24b which supports the claw portion 24c and the releasing lever 24a such that they can move in conjunction with each other. A releasing spring 24d engages with the engaging portion at one end, and the other end of the releasing spring 24d engages with the shaft portion 24b. When the third column lock mechanism 23 is at an operating state, the hook member and the second and third tubular members can be moved integrally with one another, through the swaying member and the coupling cap. Namely, when the column is extended, the second tubular member is pulled out from the first tubular member, and the second tubular member and the third tubular member can be pulled out concurrently, by grasping the hook portion and pulling it upwardly. After the second tubular member is locked by the first column lock mechanism, the releasing lever is pushed to release the engagement between the claw portion and the annular-shaped protruding portion of the spacer member. Subsequently, by grasping the hook portion and pulling out the third tubular member, the third tubular member is locked and secured by the second column lock mechanism.

Figure 13:
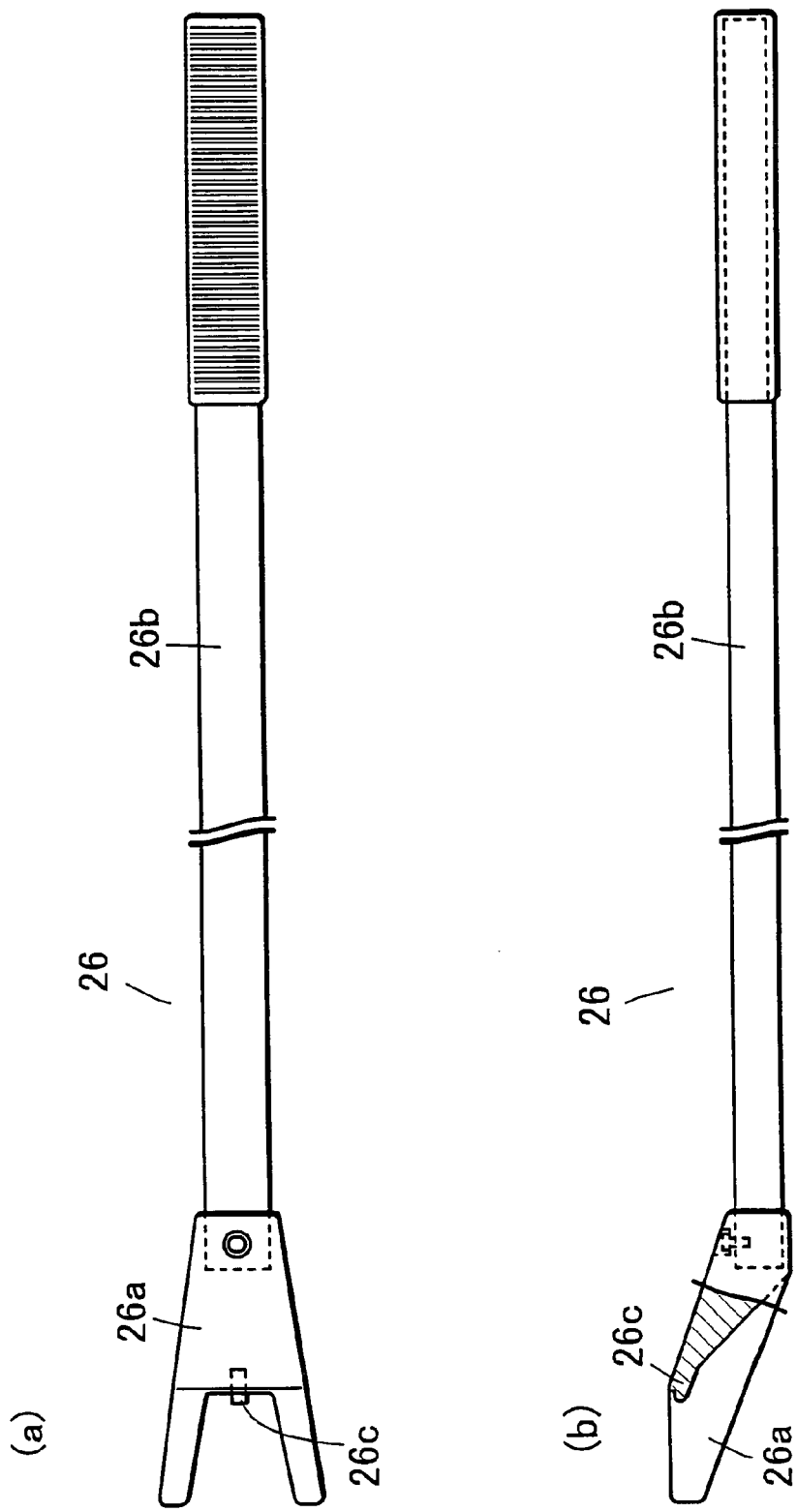
FIG. 13 is a schematic plan view (a) and a schematic side view (b) illustrating the structure of an exemplary releasing arm used in the present invention.

The releasing lever may be directly pushed by hand, but it is also possible to employ a separate releasing arm 26. FIG. 13 is a schematic plan view (a) of the releasing arm and a schematic side view (b) of the releasing arm. The releasing arm 26 includes an arm portion 26*b* and a V-shaped releasing portion 26*a* formed at the tip end of the arm portion 26*b*. By pressing a protruding portion 26*c* provided in the concave portion of the releasing portion against the releasing bar, it is possible to release the engagement between the claw portion and the annular-shaped protruding portion of the spacer member. Further, the releasing arm can be detachably mounted to, for example, the back surface of the casing, at a position other than the column housing portion.

Hereinafter, there will be described operations of the portable screen device according to the present embodiment.

At a non-usage state, as illustrated in FIG. 3, the column is tilted and housed such that it is substantially parallel to the casing. The top bar is secured to the casing as a cover member for the casing, which enables the screen device to be easily housed and carried. Further, the hook portion at the tip end of the column is pivotally supported on the column.

When the screen device is used, the column is erected at first as illustrated in FIG. 2. Then, the second and third tubular members are pulled out from the first tubular member. By grasping the hook portion and pulling it upwardly, it is possible to pull out the second and third tubular members at the same time. After the first column lock mechanism is locked to engage the second tubular member with the first tubular member, the third tubular-column lock mechanism in the hook portion is released, the third tubular member is pulled out from the second tubular member and, then, the second column lock mechanism is locked to engage the third tubular member with the second tubular member to complete the expansion of the column.

Then, if the lock mechanism for the top bar is released, the handle is grasped, and the top bar is pulled upwardly, then the screen is wound off from the spring roll against the gravity and the elasticity of a spring mounted to the spring roll. Subsequently, the handle provided on the top bar is hung on the hook portion to maintain the screen stretched.

On the other hand, when the screen device is put into storage, the pedal is pressed at a state where the handle is hung on the hook portion, which releases the first column lock mechanism, thereby causing the second tubular member to descend. At this time, the second tubular member slowly descends, since the first and second tubular members constitute an air damper. Further, the engaging protruding portion of the third tubular member comes into contact with the tip end of the releasing portion and, then, the engaging protruding portion is pushed into the concave portion of the sliding member to release the second column lock mechanism, which causes the third tubular member to descend into the second tubular member, completing the contraction of the column has been completed. After the second tubular member descends, the screen is removed from the hook portion and the top bar is dropped onto the opening portion for storage. Then, the top bar is secured to the casing using the sliding-type lock mechanism. The hook portion is rotated such that it is does not protrude to the periphery and, then, the column is laid down to be in parallel with the casing for storage.

Further, the portable screen device according to the present invention also includes devices including the following modified examples of components.

Figure 14:
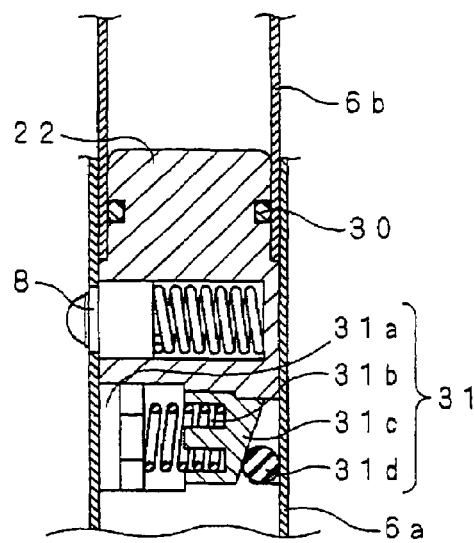
FIG. 14 is a schematic cross-sectional view illustrating the structure of a first example of modification of a sliding member.

FIG. 14 illustrates a first modification of the sliding member 22 shown in FIG. 8. In this modification, a braking mechanism 31 is used instead of the cushion ring. The braking mechanism 31 is constituted by a cylindrical flexible member 31*d* housed in a concave portion provided under the sliding member 22, a swaying piece 31*c* which presses the flexible member to bring it into contact with the inner surface of the first tubular member, a spring member 31*b* which engages with the swaying piece at one end and biases the swaying member to press the flexible member, and a screw member 31*a* which engages with the other end of the spring member and threadably engages with the concave portion. If the screw member is screwed, then the swaying piece brings the flexible member into contact with the inner surface of the first tubular member. This increases the frictional force between the flexible member and the first tubular member, thereby increasing the braking force of the piston portion. This modification is characterized in that the braking force of the piston portion can be adjusted by changing the degree of screwing the screw member.

Figure 15:
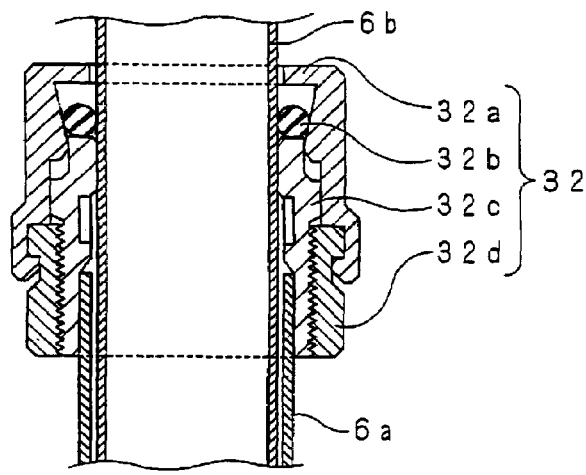
FIG. 15 is a schematic cross-sectional view illustrating the structure of a second example of modification of a sliding member.

FIG. 15 illustrates a second modification of the sliding member 22 shown in FIG. 8. In this modification, a braking mechanism 32 separated from the sliding member 22 is used instead of the cushion ring. The braking mechanism 32 is constituted by a cap member 32*c* which is fitted to the outer peripheral portion of the upper end of the first tubular member and has a female thread on its outer peripheral surface, a screw member 32*d* placed on the outer side of the cap member and threadably engages with the cap member, a cover member 32*a* which engages with the screw member and protects the cap member, and a pair of cylindrical flexible members 32*b* opposing to each other with the second tubular member interposed therebetween in the gap between the cap member and the cover member. If the screw member is screwed, the pair of flexible members are brought into contact with the outer peripheral surface of the second tubular member, which increase the frictional force between the flexible members and the second tubular member, thereby increasing the braking force of the piston portion. This modification is characterized in that the braking force of the piston portion can be adjusted by changing the degree of screwing the screw member.

Figure 16:
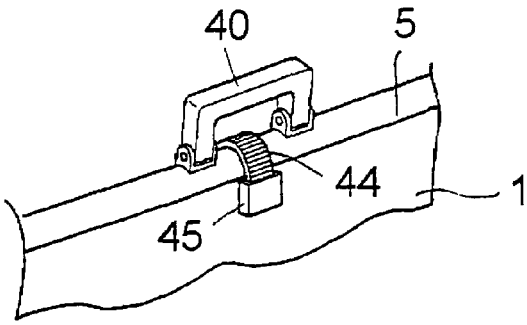
FIG. 16 is a schematic perspective view illustrating the structure of a first example of modification of a lock mechanism.

FIG. 16 illustrates a first modification of the lock mechanism shown in FIG. 6. In this modification, there is provided a belt member which is secured to a side surface of the casing 1 at one end and detachably secured to the other side surface of the casing 1 at the other end portion thereof such that it straddles the top bar 5. As illustrated in FIG. 16, a handle 40 is secured to the top bar at substantially the center portion thereof, and the free end portion of the belt member 44 is detachably secured through a securing member 45 secured to a side surface of the casing such that the belt member 44 straddles the top bar. According to this modification, the lock mechanism can have a simple structure, thereby enabling provision of a lower-cost portable screen device.

Figure 17:
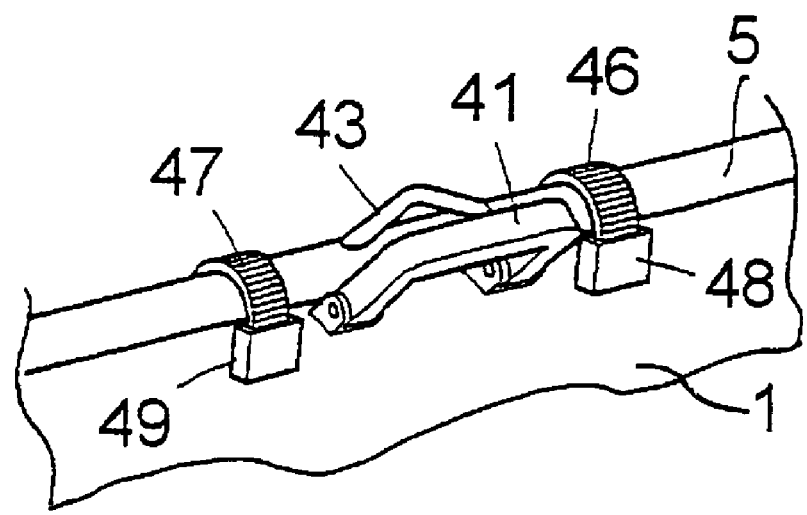
FIG. 17 is a schematic perspective view illustrating the structure of a second example of modification of the lock mechanism.

FIG. 17 illustrates a second modification of the lock mechanism. In this modification, a pair of belt members is employed as the lock mechanism. Belt members 46 and 47 are secured to a side surface of the casing 1 at first ends and detachably secured to the other side surface of the casing 1 at the other end portions thereof such that they straddle the top bar 5. The free end portions of the belt members 46 and 47 are detachably secured to securing members 48 and 49 secured to the other side surface of the casing 1. A handle 41 is secured to the casing 1 at substantially the center portion thereof between the securing members 48 and 49, and a hanging member 43 is secured to the center portion of the top bar 5. According to this modification, the lock mechanism has a simple structure, and the pair of belt members secure the top bar to the casing more reliably.

Figure 18:
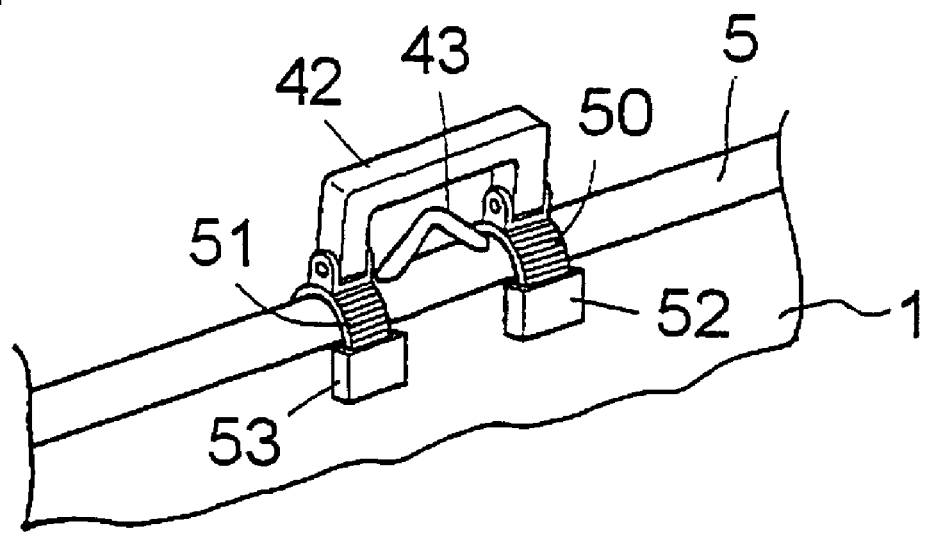
FIG. 18 is a schematic perspective view illustrating the structure of a third example of modification of the lock mechanism.

FIG. 18 illustrates a third modification of the lock mechanism. In this modification, there will be described a case of employing a pair of belt members integrated with a handle, as the lock mechanism. Belt members 50 and 51 are secured to a side surface of the casing 1 first ends thereof and detachably secured to the other side surface of the casing 1 at the other end portions thereof such that they straddle the top bar 5. The free end portions of the belt members 50 and 51 are detachably secured to securing members 52 and 53 secured to the other side surface of the casing 1. A handle 42 is pivotally connected at its opposite ends to the pair of belt members 50 and 51. Further, a hanging member 43 is secured to the center portion of the top bar 5. According this modification, the lock mechanism has a simple structure and the pair of belt members secure the top bar to the casing more reliably.

Second Embodiment

A portable screen device according to the second embodiment is similar to the portable screen device according to the first embodiment, in that it includes a column lock releasing mechanism for releasing the engagement between the first tubular member and the second tubular member. However, in the second embodiment, a gas spring is placed within the second tubular member in place of the second air damper used in the first embodiment. A hanging member and a handle are also provided on the top bar. The differences between this embodiment and the portable screen device according to the first embodiment are described below.

Figure 19:
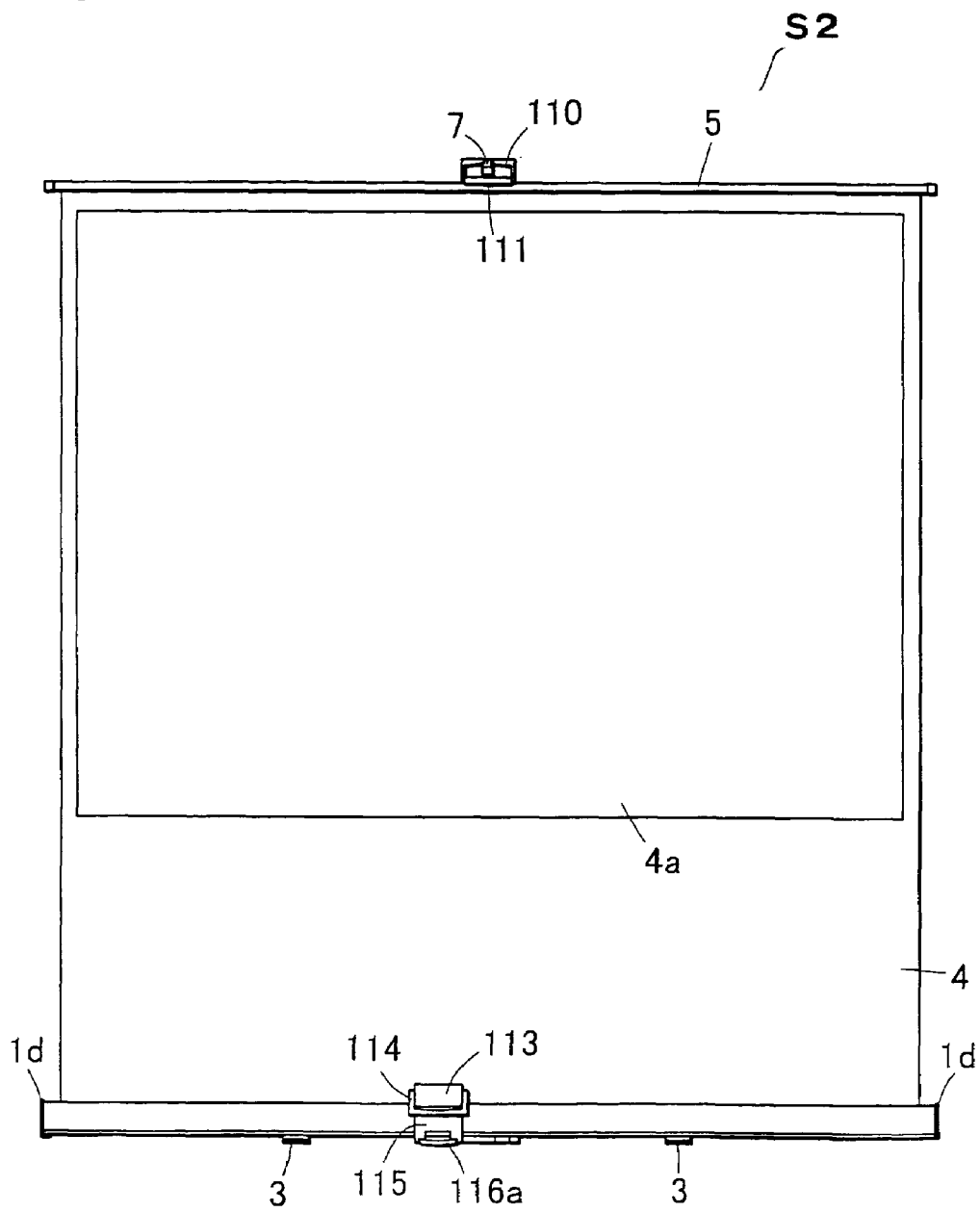
FIG. 19 is a schematic perspective view illustrating the structure of an exemplary portable screen device according to a second embodiment of the present invention, at a state where it is used, when viewed from the front side.
Figure 20:
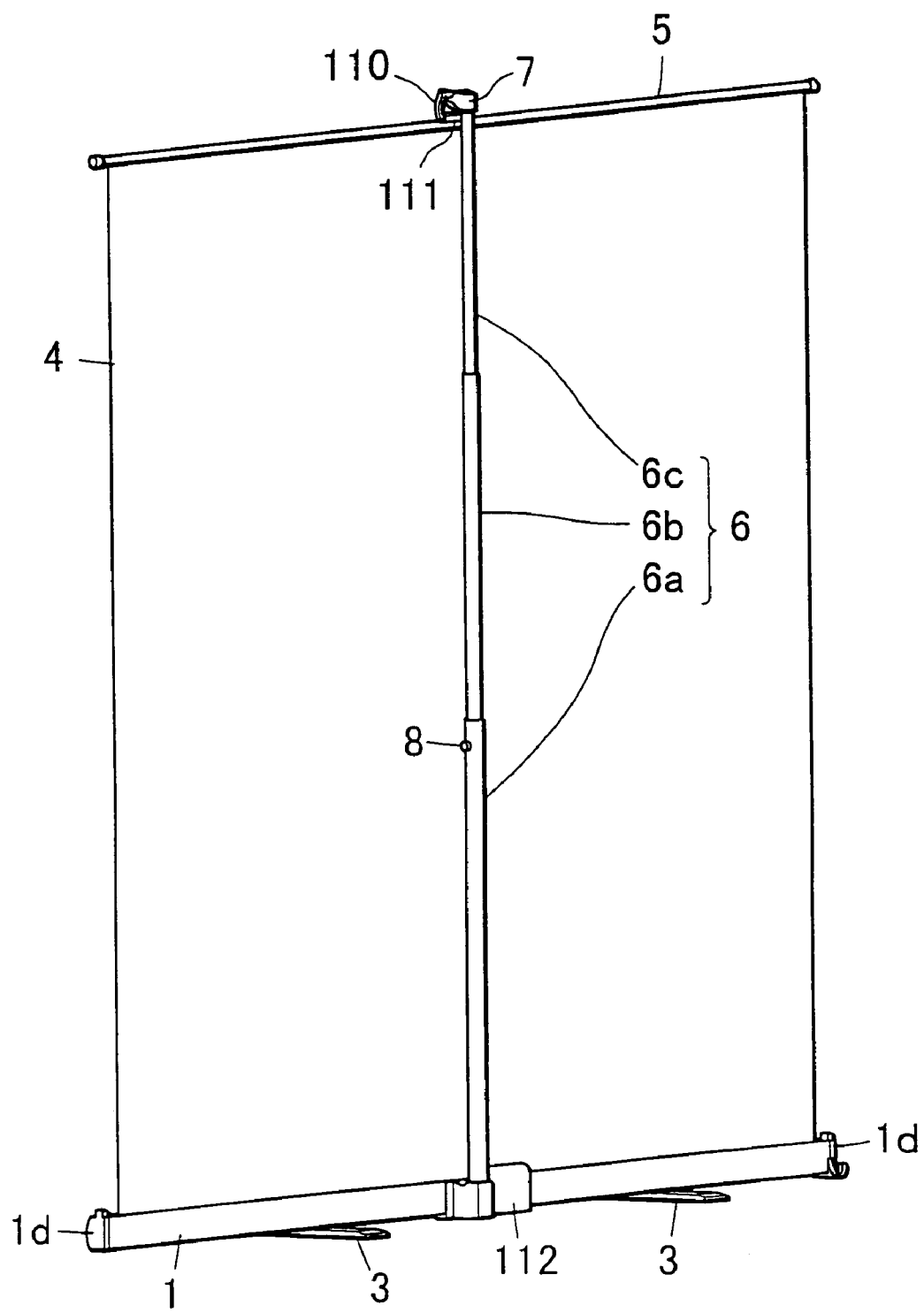
FIG. 20 is a schematic perspective view illustrating the structure of an exemplary portable screen device according to the second embodiment of the present invention, at a state where it is used, when viewed from the back side.

FIGS. 19 and 20 are a schematic front view and a schematic back perspective view illustrating an example of portable screen device S2 according to the present embodiment in use. A screen 4 including a projection surface 4a is erected through a column fitting member 112 at the back surface of a casing 1, and is maintained stretched by a column 6 having a horizontally-rotatable hook portion 7 at its tip end. At substantially the center portion of the top bar 5, a hanging member 110 is placed through a mounting member 111. The hanging member 110 is hung on the hook portion 7 to hang the screen 4 downwardly therefrom. At a position spaced apart from the center of the casing 1, there are placed a carrying handle 114, a lock mechanism 113 for securing the top bar 5 to the casing 1, a to-be-engaged portion 115 which engages with the lock mechanism 113, and a pedal 116 which forms a portion of a column lock releasing mechanism.

Figure 21:
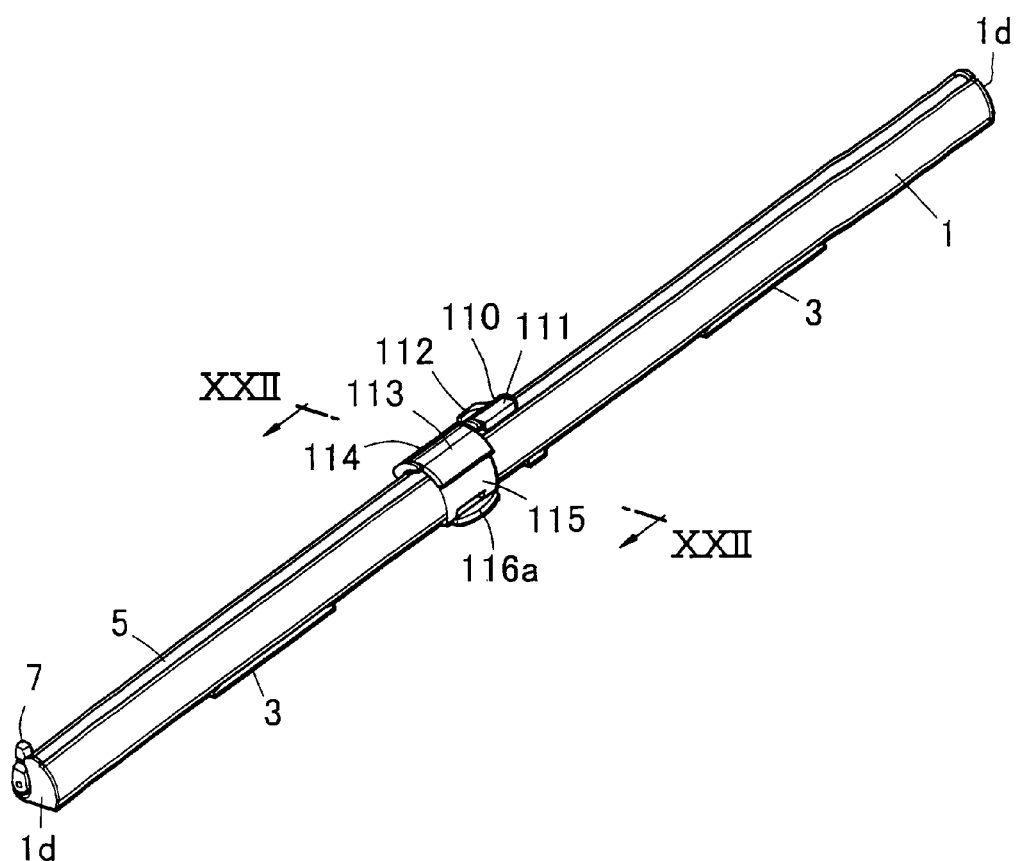
FIG. 21 is a schematic perspective view illustrating the structure of the portable screen device of FIG. 19, shown in the stored state.

FIG. 21 illustrates the portable screen S2 in storage. The column 6 is rotated about its lower end supported by the column fitting member 112 to be folded. Accordingly, the column 6 is stored to be in parallel with the casing 1. The carrying handle 114 is placed on the top bar 5 such that it is spaced apart from the hanging member 110 in the direction of extension of the column 6. The lock mechanism 113 engages with the to-be-engaged portion 115 which is placed to contact with the casing 1, so that the top bar 5 is secured to the casing 1. Further, the pedal 116a is placed on the bottom portion of the casing 1 such that it protrudes from the lower portion of the to-be-engaged portion 115. In general, if the handle is provided at the center of the top bar, the balance of the screen device in the horizontal direction will be disrupted due to the weight of the tilted column, which, in turn, will cause the screen device to be inclined forward or rearward, thereby requiring extra force to carry the screen device being in storage. However, providing the handle nearly above the center of gravity of the screen device can maintain the balance in the horizontal direction, thereby enabling easy carrying of the screen device.

Figure 22:
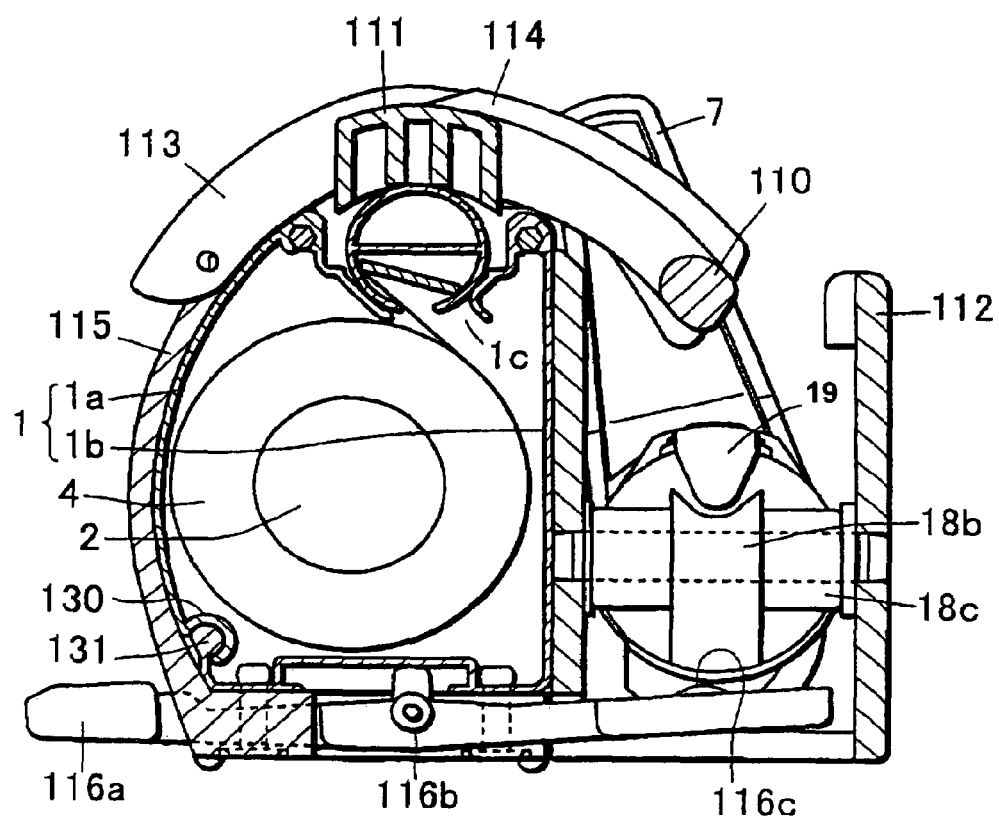
FIG. 22 is a schematic longitudinal cross-sectional view taken along the line XXII-XXII in FIG. 21.
Figure 23:
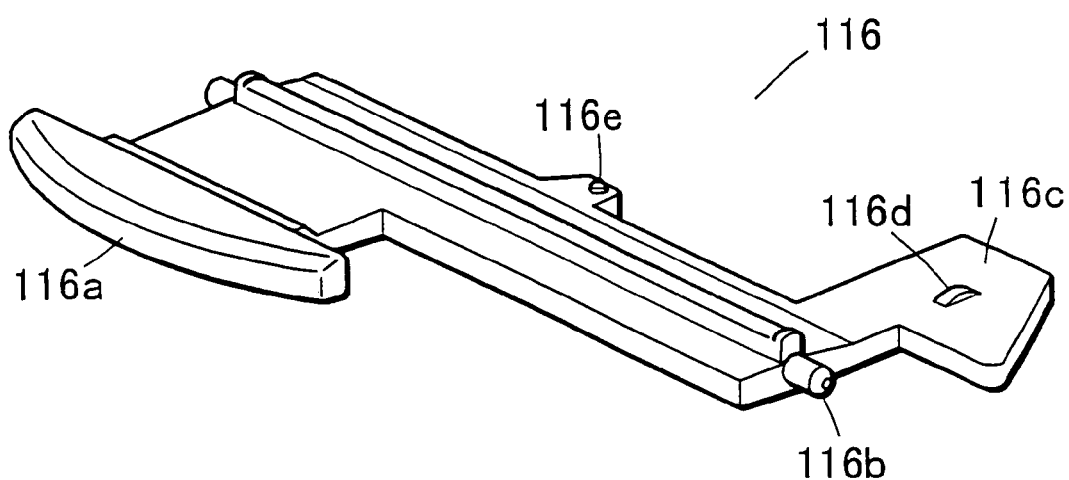
FIG. 23 is a schematic plan view illustrating an exemplary pedal mechanism for use in the portable screen device of FIG. 19.

FIG. 22 is a longitudinal cross-sectional view taken along the line XXII-XXII in FIG. 21. On the back surface of the casing 1, the column fitting member 112 for supporting the column 6 is mounted. The column fitting member 112 is fastened and secured to the bottom portion of the casing 1 through rivets 14 and 15. On the bottom surface of the casing, there is placed a pedal mechanism 116 pivotally supported about an axis of the casing, wherein the pedal mechanism 116 includes the pedal 116a protruding from the front surface of the casing. As illustrated in a schematic plan view of FIG. 23, the pedal mechanism 116 includes the pedal 116a at one end, a swaying portion 116c which is formed from a protruding piece with a small width that swings in the upward and downward directions at the other end thereof, and a shaft portion 116b which causes the pedal 116a and the swaying portion 116c to move in conjunction with each other. Further, the swaying portion 116c includes a push-up portion 116d which operates a releasing portion which will be described later, and a first spring engaging portion 116e which engages with an end of a restoring spring (not illustrated) for applying a restoring force to the pedal. When the screen device is stored, the other end of the restoring spring is engaged with a second spring engaging portion (not illustrated) provided in the column fitting member, so that the pedal is restored to a standby position through the biasing force of the restoring spring.

The lock mechanism 113 for securing the top bar to the casing is pivotally supported on the casing at its one end, while the other end forms a free end. In operation, the free end engages with the to-be-engaged portion 115 which faces thereto across the opening portion to lock the lock mechanism 113. The to-be-engaged portion 115 is placed on the surface of a first case member 1a and is fastened at its one end to the bottom portion of the casing 1 through a rivet 14 and fastened and secured to the first case member 1a through a rivet (not illustrated). Also, the lock mechanism is not limited to such a lock mechanism, but it is possible to employ the sliding lock mechanism according to the first embodiment or various types of lock mechanisms capable of engaging engageable members with each other across the opening portion of the casing.

Figure 24:
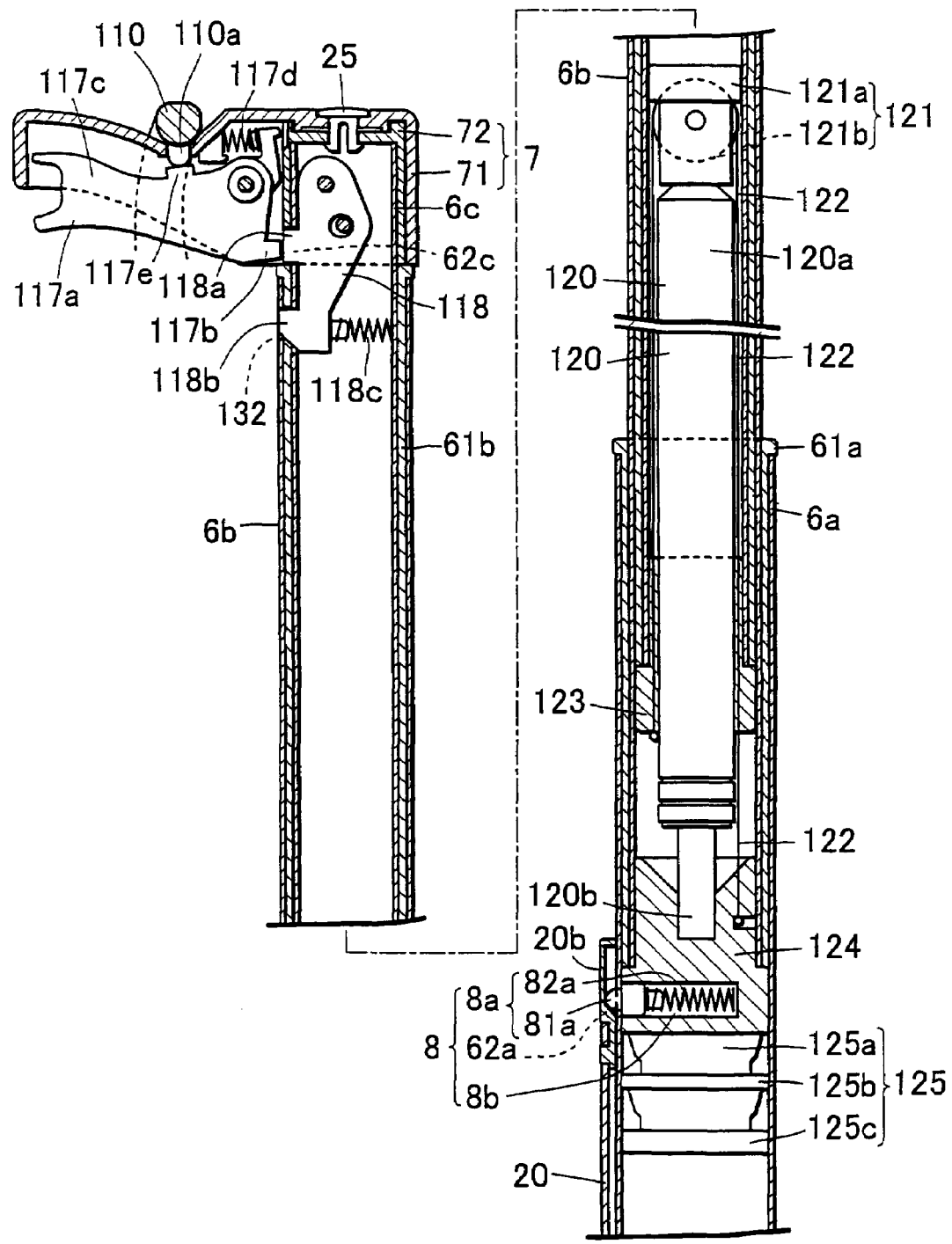
FIG. 24 is a schematic cross-sectional view illustrating the structures of a hook portion and a hoisting/lowering mechanism for use in the portable screen device of FIG. 19.

FIG. 24 is a schematic longitudinal cross-sectional view illustrating an exemplary screen device using a hoisting/lowering mechanism, at a state before the column is erected and the third tubular member 6c is pulled out from the second tubular member 6b. The hoisting/lowering mechanism is constituted by a gas spring 120 including a cylinder 120a and a piston rod 120b slidable in the axial direction within the cylinder, a pulley portion 121 including a pulley supported on the upper end portion of the cylinder 120a, and a wire 122 stringed around the pulley. The gas spring 120 is placed within the second tubular member 6b such that the cylinder 120a is positioned at its upper side. The outer end portion of the piston rod 120b is secured to the sliding member 124 mounted to the inner peripheral surface of the lower end portion of the second tubular member 6b, and the cylinder 120a can be moved upwardly and downwardly. The pulley portion 121 is constituted by a single pulley 121a supported on the upper end portion of the cylinder 120a and a pulley cover 120b which protects the pulley. The wire 122 stringed around the pulley is secured at one end to the sliding member 124 which secures the outer end portion of the piston rod 120b and is secured at the other end thereof to a sliding member 123 mounted to the lower end portion of the third tubular member, so that the wire 122 is tensioned. In this case, it is preferable that pulley portion is mounted to a bracket provided on the upper end portion of the cylinder.

In the gas spring, a high-pressure gas is enclosed within the cylinder through a piston including an orifice, and the change of the volume within the cylinder along with the expansion and contraction of the piston rod is adjusted by the change of the gas pressure directly or indirectly through an oil. At the state of FIG. 24, as will be described later, the third tubular member is engaged with and secured to the second tubular member and, since the other end of the wire is pulled downwardly, the tensile force acts as a compressive force which pushes the piston rod into the cylinder against the repulsion force caused by the gas pressure within the cylinder. On the other hand, if the engagement between the third tubular member and the second tubular member is released, then the other end of the wire is pulled upwardly due to the repulsion force caused by the gas pressure within the cylinder, which causes the third tubular member to ascend integrally with the cylinder to be pulled out from the second tubular member. Further, when the third tubular member is put into storage, the third tubular member is pushed, which pulls the other end of the wire downwardly, thereby causing the cylinder to descend, while a repulsion force is caused by the gas pressure within the cylinder, which allows the third tubular member to descend slowly and smoothly.

In this case, since the wire is stringed around a single pulley, it is possible to provide a hoisting/lowering stroke that is twice the expansion/contraction stroke of the gas spring. This can increase the hoisting/lowering stroke of the third tubular member without restricting of the expansion/contraction stroke of the gas spring, which enables suitably employing the hoisting/lowering mechanism for a large-size screen with a size of 100 inch and the like.

On the other hand, the third column lock mechanism for moving the second tubular member 6b and the third tubular member 6c integrally is constituted by a swaying member 117 placed within the hook portion 7, and a lock member 118 placed within the upper end portion of the third tubular member 6c. In this case, the hook portion 7 includes a hook member 71, a first swaying member 117 for releasing the engagement between the second tubular member 6b and the third tubular member 6c, a supporting member 72 concentrically inserted in the hook member 7 for horizontally pivotally supporting the hook member 71, and a coupling cap 25 for coupling the supporting portion 72 and the hook portion 71 to each other.

Figure 25:
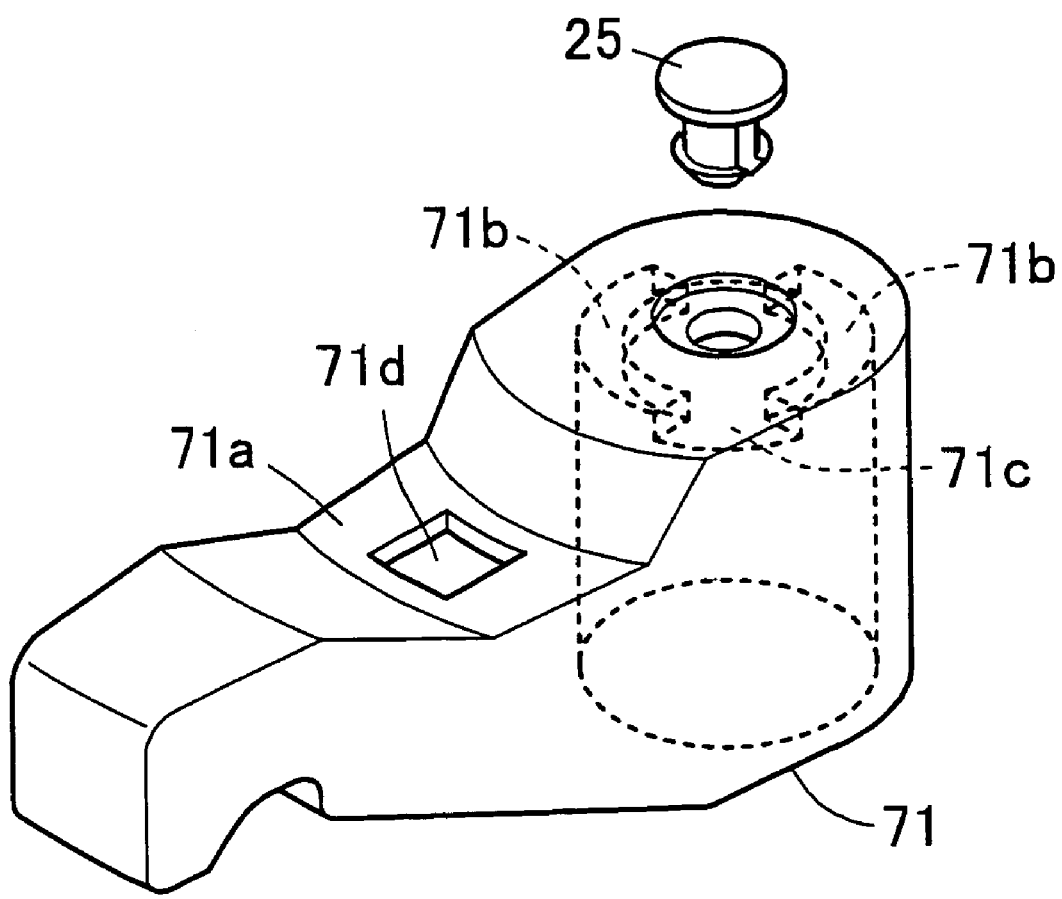
FIG. 25 is a schematic perspective view illustrating the structure of a hook portion for use in the portable screen device of FIG. 19.

The swaying member 117 is supported within the hook member 71 such that it can swing upwardly and downwardly, and includes a butting protrusion 117b at its one end, a releasing lever 117a at the other end, and a shaft portion 117c which supports the butting protrusion 117b and the releasing lever 117a such that they can move in conjunction with each other. A biasing spring 117d engages with the hook member 71 at its one end, while the other end of the biasing spring 117d engages with the shaft portion 117c. Further, the shaft portion 117c has an engaging protruding portion 117e and, in the state that the screen is not used, the engaging protruding portion 117e engages with an engaging hole 71d provided in the engaging portion 71a illustrated in FIG. 25 to secure the swaying member 117 to the hook member 71. At this state, the releasing lever 117a is housed in the hook member 71, which makes it impossible to operate the releasing lever 117a. In order to release the engagement, the hanging member 110 can be hung on the engaging portion 71a of the hook member 71. The protruding portion 110a at the lower portion of the hanging member 110 pushes the engaging protruding portion 117e downwardly, thereby releasing the engagement between the engaging protruding portion 117e and the engaging hole 71d. This causes the swaying member 117 to sway downwardly, which causes the releasing lever 117a to protrude from the lower portion of the hook member 71, which enables pushing downwardly the releasing lever 117a through a pushing operation with one's fingers.

Further, the lock member 118 includes engaging protruding portions for engaging the second tubular member 6b and the third tubular member 6c with each other, and the lock member 118 is supported within the upper end portion of the third tubular member 6c pivotally in the radial direction of the third tubular member. Namely, the lock member 118 includes, on a surface thereof, an upper first engaging protruding portion 118a and a lower second engaging protruding portion 118b which are formed along a straight line in the vertical direction. An upper first engaging hole 62c and a lower second engaging hole 63c are formed in the third tubular member along a straight line in the vertical direction, and the first engaging protruding portion 118a engages with the first engaging hole 62c while the second engaging protruding portion 118b engages with the second engaging hole 63c. Further, a biasing spring 118c engages with the inner surface of the third tubular member at its one end and biases the second engaging protruding portion 18b such that it engages with the second engaging hole 63c, and the other end of the biasing spring 118c engages with one end of the second swaying member. Further, the second engaging hole 63c in the third tubular member is positioned so that the third tubular member is pushed into the second tubular member and housed therein, and the second engaging hole 63c forms a portion of an engaging hole 132 through the second tubular member, the spacer member 61b, and the third tubular member 6c.

When the third column lock mechanism is at an operating state, the hook member and the second and third tubular members 6b, 6c can be moved integrally, through the swaying member 117 and the coupling cap 25. Namely, when the column is extended, the second tubular member 6b is pulled out from the first tubular member 6a, and the second tubular member 6b and the third tubular member 6c can be pulled out concurrently, by grasping the hook portion 7 and pulling it upwardly. Then, in order to pull out the third tubular member 6c from the second tubular member 6b, the releasing lever 117a of the swaying member 117 can be pushed downwardly. Namely, as previously described, in the state that the hanging member 110 is hung on the engaging portion 71a of the hook member 71, the releasing lever 117a is protruded from the lower portion of the hook member 71, which enables easily pushing downwardly the releasing lever 117a through a pushing operation with one's fingers. If the releasing lever 117a is pushed downwardly, the butting protrusion 117b of the swaying member 117 is brought into contact with the first engaging protruding portion 118a of the lock member 118 to push it into the third tubular member 6c, which causes the lock member 118 to sway inwardly in the third tubular member 6c against the biasing force of the spring member 118c, thereby releasing the engagement between the second engaging protruding portion 118b and the engaging hole 132. This causes the other end of the wire to be pulled upwardly due to the repulsion force caused by the gas pressure within the cylinder of the gas spring, which causes the third tubular member to ascend integrally with the cylinder to be pulled out from the second tubular member. At this time, by hanging the screen from the hook portion in pulling out the third tubular member 6c from the second tubular member 6b, when the releasing bar is pushed downwardly, the screen is automatically stretched along with the ascent of the third tubular member. Further, the repulsion force caused by the gas pressure within the cylinder of the gas spring suppresses the descent of the third tubular member. Accordingly, in the present embodiment, it is possible to eliminate the second column lock mechanism for securing the third tubular member to the second tubular member.

Further, the screen device according to the present embodiment also includes a first air damper for reducing the descending velocity of the second tubular member 6b and gradually dropping the second tubular member 6b. Namely, as illustrated in FIG. 24, under the sliding member 124 placed at the lower end portion of the second tubular member 6b, there is placed a piston portion 125 which can be slid within the first tubular member at a hermetic state. Further, a first air exhaust portion (not illustrated) is provided in a supporting member at the bottom portion of the first tubular member to enclose the air within the first tubular member 6a with the piston portion 125 for forming a first air damper. Further, the piston portion 21 is constituted by a counter-tapered rod 125a mounted to the bottom portion of the sliding member 124, an annular-shaped protruding portion 125b formed on the rod 125a, and a piston packing 21b which is mounted to the lower end portion of the rod 125a to slidably contact with the inner peripheral surface of the first tubular member 6a. The structure of the first exhaust portion and the operations and the mechanism of the first air damper are similar to those of the first embodiment and, therefore, they are not described herein.

Hereinafter, there will be described operations of the portable screen device according to the present embodiment.

When the screen device is used, the column is erected first. Then, the second and third tubular members are pulled out from the first tubular member. By grasping the hook portion and pulling it upwardly, the second and third tubular members are pulled out therefrom at the same time. Then, the first column lock mechanism is locked to engage the second tubular member with the first tubular member. Then, the hanging member provided on the top bar is hung on the hook portion, and the releasing lever in the hook portion is pushed downwardly, which releases the engagement between the second tubular member and the third tubular member and causes the third tubular member to automatically ascend to be pulled out from the second tubular member, due to the repulsion force caused by the gas pressure within the cylinder of the gas spring, thereby stretching the screen pulled out from the spring roll. The repulsion force caused by the gas pressure prevents the descent of the third tubular member, which can maintain the screen stretched.

On the other hand, when the screen device is put into storage, the pedal is pressed at a state where the hanging member is hung on the hook portion, which releases the first column lock mechanism, thereby causing the second tubular member to descend. At this time, the second tubular member slowly descends, since the first and second tubular members constitute an air damper. Subsequently, the hanging member is removed from the hook portion, and the top bar is dropped onto the opening portion to house the screen in the casing. Then, the third tubular member is pushed into the second tubular member and, at this time, the repulsion force caused by the gas pressure within the cylinder acts as a braking force against the descent of the third tubular member, thereby causing the third tubular member to descend gradually. Then, the third tubular member is secured to the second tubular member through the lock member. Thus, the contraction of the column is completed. Then, the top bar is secured to the casing through the lock mechanism. The hook portion is rotated such that it is not protruded to the periphery and, thereafter, the column is laid down to be parallel to the casing for storage.

As described above, the portable screen device according to the present embodiment includes the hoisting/lowering mechanism constituted by a gas spring within the second tubular member. Accordingly, in use, it is possible to hoist, automatically, the third tubular member only by pushing, downwardly, the releasing lever provided in the hook portion. This enables easily stretching the screen, even when the screen is a large-size screen with a size of 100 inch or the like. On the other hand, when the screen device is put into storage, the third tubular member can be slowly dropped and housed in the second tubular member, thereby enabling smoothly putting the screen device into storage. Further, the handle is provided nearly above the center of gravity of the screen device, which can maintain the balance of the screen device in the horizontal direction, thereby enabling easily carrying the screen device which has been put into storage. Further, the screen device according to the present invention includes the column lock releasing mechanism, which enables contracting the column through a single pedal-pressing operation, thereby offering the advantage of ease of the operations for putting the screen device into storage.

Further, while, in the present embodiment, there has been exemplified a case where a single pulley is provided on the cylinder, it is also possible to employ two or more pulleys. Namely, two or more pulleys can be secured to the respective end portions of the cylinder and the piston rod of the gas spring, such that the same number of pulleys are supported on the respective end portions, and a wire can be secured at its one end to the sliding member placed on the inner peripheral surface of the lower end portion of an upper tubular member and also stringed around the two or more pulleys alternately while the other end of the wire can be secured to an end portion of the piston rod. In this case, the hoisting/lowering stroke of the third tubular member can be increased in proportion to the number of times the stringed wire travels upwardly and downwardly and, for example, in the case where the wire travels upwardly and downwardly twice, it is possible to provide a hoisting/lowering stroke which is four times the expansion/contraction stroke of the gas spring. In the case where the wire travels upwardly and downwardly four times, it is possible to provide a hoisting/lowering stroke which is eight times the expansion/contraction stroke of the gas spring. However, in order to reduce the size and the weight of the column, it is preferable to employ only a single pulley.

Further, while, in the present embodiment, the gas spring is placed within the second tubular member such that the cylinder is positioned at the upper side, it is also possible to place the gas spring such that the piston head is positioned at the upper side. In this case, a single pulley is supported on the lower end portion of the piston head, and a wire stringed around the pulley is secured at its one end to the upper end portion of the cylinder and also is secured at the other end to the sliding member placed on the inner peripheral surface of the lower end portion of the upper tubular member so that the wire is tensioned. Further, the cylinder is secured at its upper end portion to the upper portion of the sliding member in the second tubular member, while the piston rod is engaged, at its upper portion, with the sliding member mounted to the inner peripheral surface of the lower end portion of the third tubular member.

As described above, according to the present invention, there is provided the column lock releasing mechanism for releasing the engagement between the lowermost tubular member and the upper tubular member next thereto, in conjunction with the pressing of the pedal, which enables contracting the column through a single pedal-pressing operation, thereby enabling easily putting the screen device into storage.

What is claimed is:

1. A portable screen device comprising:
   a casing having an opening extending in a longitudinal direction in an upper surface thereof;
   a spring-biased roll rotatably mounted in said casing;
   a screen wound around said spring-biased roll in a storage position, said screen being extendable from said opening;
   a top bar secured to one end of said screen, said top bar serving as a cover for closing said opening in the storage position of said screen;
   an extendable column for supporting said screen in an extended state, said column having one end supported at a center portion of a back face of said casing, and including a plurality of tubular members slidable with respect to one another, said plurality of tubular members including a lowermost first tubular member, and a second tubular member extendable from said first tubular member;
   a first column lock mechanism for locking said first tubular member relative to said second tubular member to maintain said column at a desired height; and
   a column lock releasing mechanism operatively coupled to said first column lock mechanism, said column lock releasing mechanism comprising a pedal supported on a bottom surface of said casing, wherein said pedal can be pressed to release said first and second tubular members.

2. The portable screen device according to claim 1, wherein said first column lock mechanism comprises:
   a first sliding member mounted to an inner peripheral surface of said second tubular member at a lower end portion thereof;
   a first receiving portion comprising a through hole formed in an upper end portion of said first tubular member; and
   a first engaging portion disposed in a concave portion of said first sliding member, said first engaging portion comprising an engaging protruding portion adapted to engage with said through hole, and a spring member for biasing said engaging protruding portion toward said first receiving portion.

3. The portable screen device according to claim 1, wherein said column lock releasing mechanism further comprises:
   a releasing portion disposed on a side surface of said lowermost first tubular member, said releasing portion being capable of moving between a securing position and a releasing position in which said first and second tubular members are released; and
   a coupling portion for transferring an operation force from said pedal to said releasing portion to move said releasing portion between the securing and releasing positions.

4. The portable screen device according to claim 3, wherein said pedal protrudes from a front surface of said casing and is adapted to pivot about an axis of said casing.

5. The portable screen device according to claim 4, wherein said coupling portion comprises:
   a transmission member comprising a supporting portion supported on a base portion of said first tubular member through a spring member; and
   a push-up portion having one end engaged with said releasing portion, wherein said spring member biases said push-up portion such that said releasing portion moves to the securing position, and pressing said pedal causes said releasing portion to move to the releasing position.

6. The portable screen device according to claim 3, wherein said releasing portion comprises a releasing bar having a tip end with a tapered cross-sectional area, said tip end being adapted to push said engaging protruding portion into the concave portion of said first sliding member to release said first and second tubular members.

7. The portable screen device according to claim 6, further comprising a third tubular member, and a second column lock mechanism for locking said third tubular member relative to said second tubular member, said second column lock mechanism comprising:
   a second receiving portion including a through hole formed in an upper end portion of said second tubular member;
   a second sliding member mounted to an inner peripheral surface of a lower end portion of said third tubular member; and
   a second engaging portion disposed in a concave portion of said second sliding member, wherein said second engaging portion comprises a second engaging protruding portion adapted to engage with said through hole formed in said second tubular member, and a spring member for biasing said second engaging protruding portion toward said second receiving portion such that pressing said pedal causes said first and second tubular members to be released, said second tubular member to descend, and the tip end of said releasing bar to contact said second engaging protruding portion to release said second and third tubular members.

8. The portable screen device according to claim 1, further comprising:
   a first sliding member mounted to an inner peripheral surface of said second tubular member at a lower end portion thereof;
   a first piston portion which is slidable within said first tubular member, and disposed on a bottom portion of said first sliding member; and
   a first exhaust portion disposed through a base portion of said first tubular member so that said first tubular member and said second tubular member constitute a first air damper.

9. The portable screen device according to claim 8, further comprising
   a third tubular member;
   second exhaust portion disposed through an upper portion of the said first sliding member;
   a second sliding member mounted to an inner peripheral surface of said third tubular member at a lower end portion thereof; and
   a second piston portion which is slidable within said second tubular member, and disposed on a bottom portion of said second sliding member so that said second tubular member and said third tubular member constitute a second air damper.

10. The portable screen device according to claim 8, wherein said first piston portion comprises:
    a rod portion mounted to the bottom portion of said first sliding member;
    a piston packing mounted to a tip end of said rod portion for slidably contacting with an inner peripheral surface of said first tubular member; and
    one or more cushion rings mounted to a middle portion of said rod portion.

11. The portable screen device according to claim 10, wherein said rod portion has a counter-tapered shape and a smaller diameter at a side closer to said first tubular member.

12. The portable screen device according to claim 1, wherein said column further comprises a hoisting and lowering mechanism comprising a gas spring, said gas spring being disposed within said lowermost first tubular member for hoisting and lowering an upper one of said tubular members.

13. The portable screen device according to claim 12, wherein said gas spring comprises a cylinder capable of moving integrally with the upper tubular member, and a piston capable of sliding within said cylinder in an axial direction.

14. The portable screen device according to claim 1, further comprising:
- a third tubular member;
- a first sliding member mounted within said second tubular member;
- a second sliding member mounted to an inner peripheral surface of said third tubular member at a lower end portion thereof; and
- a gas spring comprising:
  - a piston with a lower end secured to an upper portion of said first sliding member;
  - a moveable cylinder having a lower end engaged with said second sliding member;
  - a pulley supported on an upper end of said cylinder, and
  - a tensioned wire wrapped around said pulley, wherein one end of said wire is secured to said first sliding member, and the other end of said wire is secured to said second sliding member, such that said third tubular member can be hoisted and lowered by movement of said cylinder.

15. The portable screen device according to claim 1, further comprising:
- a hanging member secured to a center portion of said top bar; and
- a hook portion disposed at an upper end portion of said column, said hook portion comprising a hook member with an engaging portion adapted to engage with said hanging member such that said hanging member can be hung on said hook portion.

16. The portable screen device according to claim 15, further comprising a carrying handle coupled to said top bar so as to extend above said hanging member and a center portion of said top bar.

17. The portable screen device according to claim 15, wherein said hanging member is adapted to be used as a carrying handle.

18. The portable screen device according to claim 15, wherein said hook portion is pivotally mounted to the upper end portion of said column such that, when said column is moved to a storage position, said hook portion can be rotated to contact said casing.

19. The portable screen device according to claim 15, further comprising:
- a swaying member placed within said engaging portion, said swaying member adapted to engage with an upper end portion of said second tubular member;
- a supporting portion concentrically fitted within said hook member for pivotally supporting said hook member such that said hook member can be pivoted in a horizontal direction; and
- a coupling cap for coupling said supporting portion and said hook member to each other.

20. The portable screen device according to claim 19, wherein one end of said swaying member includes a claw portion for engaging with an annular-shaped protruding portion at a tip end of a spacer member fitted to said second tubular member, such that said hook portion, said second tubular member, and a third tubular member can be integrally pulled from said first tubular member.

21. The portable screen device according to claim 19, further comprising a third tubular member, and a second column lock mechanism for locking said second tubular member relative to said third tubular member, said second column lock mechanism being disposed within an upper end portion of said third tubular member.

22. The portable screen device according to claim 21, wherein said swaying member has a butting protrusion adapted to abut said lock member at one end, and a releasing lever at the other end which can be pressed downwardly to cause said butting protrusion to abut and push said lock member into said third tubular member to release said second tubular member and said third tubular member.

23. The portable screen device according to claim 22, wherein said engaging portion of said hook member includes an engaging hole, and said swaying member has an engaging protruding portion which can be engaged with said engaging hole such that said releasing lever can be housed in said hook member when said screen is not used, and said hanging member is adapted to push said engaging protruding portion downwardly when said screen is used to disengage said engaging protruding portion and said engaging hole to cause said releasing lever to protrude from a lower portion of said hook member.

24. The portable screen device according to claim 1, further comprising a sliding-type lock mechanism for securing said top bar to said casing at a storage state, wherein said lock mechanism comprises:
- a cover member having a claw portion at one end;
- an idler shaft coupled to the other end of said cover member;
- a pivotal shaft coupled to said idler shaft; and
- an engaging portion adapted to engage with said claw portion such that said cover member covers said opening of said casing.

25. The portable screen device according to claim 24, wherein said lock mechanism further comprises a spring member for maintaining said cover member in an opened position, said spring member being wound around said idler shaft and said pivotal shaft in an S shape so as to contact said casing at one end and said cover member at the other end.

* * * * *